US011456887B1

(12) United States Patent
McCracken et al.

(10) Patent No.: US 11,456,887 B1
(45) Date of Patent: Sep. 27, 2022

(54) VIRTUAL MEETING FACILITATOR

(71) Applicant: Meta Platforms, Inc., Menlo Park, CA (US)

(72) Inventors: Sean McCracken, Winter Garden, FL (US); Saransh Solanki, Seattle, WA (US); Jessica Kitchens, Berkeley, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 0 days.

(21) Appl. No.: 16/898,081

(22) Filed: Jun. 10, 2020

(51) Int. Cl.
*H04L 12/18* (2006.01)
*H04N 7/15* (2006.01)
*G06N 20/00* (2019.01)

(52) U.S. Cl.
CPC ......... *H04L 12/1831* (2013.01); *H04N 7/157* (2013.01); *G06N 20/00* (2019.01)

(58) Field of Classification Search
CPC combination set(s) only.
See application file for complete search history.

(56) References Cited

U.S. PATENT DOCUMENTS

| | | | |
|---|---|---|---|
| 2008/0059570 A1* | 3/2008 | Bill | G06T 19/006 709/203 |
| 2010/0318399 A1* | 12/2010 | Li | G06Q 10/1093 705/7.18 |
| 2011/0113351 A1* | 5/2011 | Phillips | H04N 21/4781 715/757 |
| 2014/0072143 A1* | 3/2014 | Liu | H03G 3/345 381/94.5 |
| 2017/0270930 A1* | 9/2017 | Ozmeral | G10L 17/00 |
| 2018/0336915 A1* | 11/2018 | Jalali | G10L 21/16 |
| 2019/0273767 A1* | 9/2019 | Nelson | H04L 65/4015 |
| 2020/0218350 A1* | 7/2020 | Coleman | A61B 5/7267 |
| 2021/0021439 A1* | 1/2021 | Gorny | H04L 12/1831 |

* cited by examiner

*Primary Examiner* — Phung-Hoang J Nguyen
(74) *Attorney, Agent, or Firm* — Baker Botts L.L.P.

(57) ABSTRACT

In one embodiment, a computing system may receive input data from several artificial-reality systems used by participants to participate in a virtual meeting. The input data may include audio data and sensor data corresponding to the participants while they are in the virtual meeting. The computing system may determine meeting characteristics based on input data. The meeting characteristics may include individual behavioral characteristics for each participant and communal characteristics associated with the participants as a group. The computing system may determine an action to improve a meeting characteristic according to a predetermined criteria and generate an instruction for performing the action. The computing system may send the instruction to one or more of the artificial-reality systems used by the participants. The instructions may be configured to cause an application running on each of the artificial-reality systems that receives the instruction to perform the action.

15 Claims, 10 Drawing Sheets

VIRTUAL MEETING FACILITATOR

TECHNICAL FIELD

This disclosure generally relates to controls and interfaces for user interactions and experiences in a virtual reality environment.

BACKGROUND

Virtual reality is a computer-generated simulation of an environment (e.g., a 3D environment) that users can interact with in a seemingly real or physical way. A virtual reality system, which may be a single device or a group of devices, may generate this simulation for display to a user, for example, on a virtual reality headset or some other display device. The simulation may include images, sounds, haptic feedback, and/or other sensations to imitate a real or imaginary environment. As virtual reality becomes more and more prominent, its range of useful applications is rapidly broadening. The most common applications of virtual reality involve games or other interactive content, but other applications such as the viewing of visual media items (e.g., photos, videos) for entertainment or training purposes are close behind. The feasibility of using virtual reality to simulate real-life conversations and other user interactions is also being explored.

SUMMARY OF PARTICULAR EMBODIMENTS

Disclosed herein are a variety of different ways of rendering and interacting with a virtual (or augmented) reality environment. An artificial reality system may render a artificial environment, which may include a virtual space that is rendered for display to one or more users. For instance, a virtual reality environment may be rendered, or an augmented reality environment may be rendered. The users may view and interact within this virtual space and the broader virtual environment through any suitable means. One goal of the disclosed methods is to facilitate a virtual meeting. In particular embodiments, a computing system may provide a method of determining an action configured to improve a meeting characteristic of a virtual meeting. The computing system may use input data from multiple artificial reality systems associated with participants of the virtual meeting to determine one or more meeting characteristics that correspond to individual behavioral characteristics and communal characteristics of the participants of the virtual meeting as a group. The computing system may determine an action to perform to improve a meeting characteristic based on predetermined criteria. After determining an action, the computing system may generate instructions to cause one or more of the artificial reality systems to perform the action. The computing system may send the instructions to the artificial reality systems to perform the action.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DESCRIPTION OF EXAMPLE EMBODIMENTS

Figure 1:
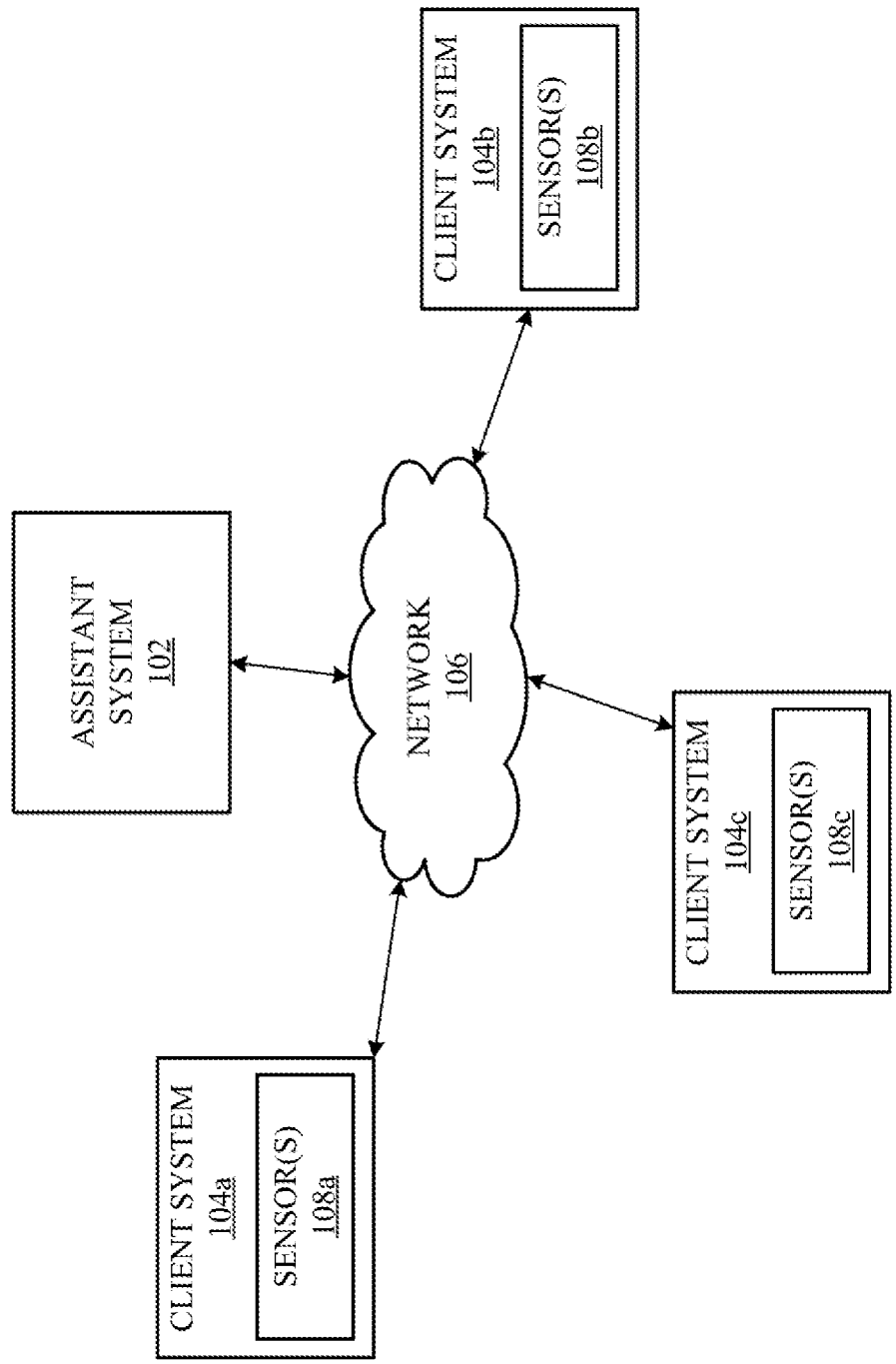
FIG. 1 illustrates an example virtual meeting environment including an assistant system.

As more people adopt artificial reality systems, more people will begin to use artificial reality systems for a variety of reasons. One use case may include virtual meetings with other users that have artificial reality systems. These virtual meetings may be represented by an augmented reality environment, a virtual reality environment, and/or a combination of the two environments. For instance, avatars or visual representations (photorealistic or not) may be used to represent participants in a virtual meeting. Each participant may be presented an environment where they can see other participants in the virtual meeting, such as an avatar representative of the participant and/or other visual representations. However, currently virtual meetings may lack many interpersonal cues that people typically rely on within a normal face-to-face meeting. This may be the result of replacing individuals in an artificial reality environment with avatars that may not accurately reflect the individual's current sentiments. As such, virtual meetings within an artificial reality environment may lead to an undesirable experience, like a decrease in rate of conversational turns, an increase in speaker dominance, an increase in rate of interruptions, or a decrease in communal emotional state. To address these issues, a virtual meeting facilitator may identify patterns of productive virtual meetings (e.g., meetings with a moderate amount of conversational turns, low rate of interruptions, and the like) and interact with meeting participants to direct the meeting in a productive manner (e.g., to increase rate of conversational turns, reduce speaker dominance, and the like). The virtual meeting facilitator may utilize a machine-learning model to identify these features of virtual meetings. In particular embodiments, the virtual meeting facilitator may be embodied as an assistant system.

In particular embodiments, in order to train a machine-learning model to identify one or more features of virtual meetings, input data from each meeting participant may be used to train the model. The input data may be received from a head-mounted display and/or additional cameras and sensors coupled to an artificial reality system for each individual meeting participant. The artificial reality system may receive audio data and determine the content of speech, tone of voice, and prosody based on the audio data. The artificial reality system may receive additional sensor data from accelerometers, gyroscopes, and cameras to determine the head pose, gaze, eye movements, body movements, and facial expression. The determined inputs may include a content of speech, a tone of voice, prosody, head pose, gaze, eye movements, body movements, and facial expression. The machine-learning model may use the determined inputs to determine features of a virtual meeting, including a rate of conversational turns, speaker dominance, rate of interruptions, and a communal sentimental state. By identifying these various features, a virtual meeting facilitator may improve upon the virtual meeting experience. As an example and not by way of limitation, if a meeting participant is constantly interrupting other meeting participants, the virtual meeting facilitator may determine the rate of interruptions is high and as a result perform an action to reduce the rate of interruptions. As an example and not by way of limitation, the virtual meeting facilitator may note the meeting participant is frequently interrupting other people. Additionally, the virtual meeting facilitator may use information about meeting participants to effectively convey a message (e.g., you're interrupting others frequently) by identifying a proper response, such as a joke, a stern statement, or a casual note.

In particular embodiments, a computing system may perform the processing as described herein. The computing system may be embodied as an assistant system, a social-networking system, or another computing system. The computing system may be wirelessly coupled to a plurality of artificial-reality systems. The plurality of artificial-reality systems may be embodied as an augmented reality headset, a virtual reality headset, or a hybrid reality headset, and the like. In particular embodiments, participants of a virtual meeting may each use one of the artificial-reality systems to participate in the virtual meeting. In particular embodiments, the computing system may receive input data from the plurality of artificial-reality systems used by participants to participate in the virtual meeting. In particular embodiments, the input data may comprise audio data and sensor data corresponding to the participants while they are participating in the virtual meeting. As an example and not by way of limitation, the artificial-reality system may have a microphone to receive audio data and/or inside-out cameras to capture facial expressions of the user.

In particular embodiments, the computing system may determine meeting characteristics comprising one or more individual behavioral characteristics for each participant and one or more communal characteristics associated with the participants as a group. The determination of meeting characteristics may be based on input data received by the artificial-reality systems. As an example and not by way of limitation, the computing system may use audio data received from an artificial reality system associated with an individual participant to determine an individual behavioral characteristic, such as a content of speech or a tone of voice. As another example and not by way of limitation, the computing system may use audio data from the plurality of artificial reality systems to determine a communal characteristic, such as a number of a rate of conversational turns.

In particular embodiments, the one or more individual behavioral characteristics may comprise one or more of a content of speech, tone of voice, prosody, head pose, gaze, eye movements, body movements, and facial expression. As an example and not by way of limitation, the computing system may receive the audio data and perform natural language processing to determine the content of speech. The audio data may also be used to determine tone of voice and prosody. In connection with natural language processing and processing a user input (e.g., audio data, visual data, and the like), particular embodiments may utilize one or more systems, components, elements, functions, methods, operations, or steps disclosed in U.S. patent application Ser. No. 16/176,081, filed 4 Dec. 2019, which is incorporated by reference. As another example and not by way of limitation, the computing system may receive sensor data, such as accelerometer data, inside-out camera data to determine a user's gaze, eye movements, body movements, head pose, and the like.

In particular embodiments, the communal characteristics may comprise one or more of a rate of conversational turns, speaker dominance, rate of interruptions, and a communal sentimental state. In particular embodiments, the computing system may determine the communal characteristics based on the input data. As an example and not by way of limitation, the computing system may use audio data from the plurality of artificial reality systems and determine one user has been talking for a time that exceeds a predetermined threshold and identify that the one user is dominating the conversation. As another example and not by way of limitation, the computing system may analyze the audio data received from the plurality of artificial reality systems to determine when one user interrupts another user in order to calculate a rate of interruptions. For instance, a scenario where one user is in the middle of a sentence and another user speaks may be determined to be an interruption. As another example and not by way of limitation, the computing system may determine a communal sentimental state by analyzing the input data to determine user sentiment. For instance, if a user has a raised tone of voice and is shaking their hands in a wild manner, then the computing system may determine that the user may be upset or angry. Additionally, if more than one user is behaving in a similar manner, the computing system may determine that the communal sentimental state may be low because users/participants in a virtual meeting may be determined to be upset or angry. In particular embodiments, the communal sentimental state may be embodied as a numerical value corresponding to value between a low value (e.g., participants are angry, upset, and other sentiments that may be detrimental to a virtual meeting by negatively affecting other communal characteristics) or a high value (e.g., participants are happy, engaged, and other sentiments that may improve a virtual meeting by positively affecting other communal characteristics). In particular embodiments, the communal sentimental state may be an identified state, such as participants are generally upset, angry, happy, and the like. The communal sentimental state may comprise multiple sentiments identified to be associated with one or more virtual meeting participants. For instance, the communal sentimental state may be virtual meeting participants are engaged and ecstatic.

In particular embodiments, the computing system may determine an action configured to improve at least one of the meeting characteristics according to one or more predetermined criteria. In particular embodiments, the computing system may be preprogrammed to identify one or more predetermined criteria. In particular embodiments, the computing system may be able to identify predetermined criteria associated with productive virtual meetings, such as virtual meetings where the communal sentimental state is high (e.g., participants are happy and/or engaged), where a virtual meeting agenda may have been completed, and the like. For instance, the computing system may determine that virtual meetings that have a completed virtual meeting agenda comprise certain meeting characteristics, such as a lower number of rate of interruptions and/or a higher number of rate of conversational turns. The computing system may be able to identify criteria that is associated with virtual meetings that have a completed virtual meeting agenda and generate a predetermined criteria to store in a predetermined criteria database. In particular embodiments, the computing system may request feedback from virtual meeting participants once a virtual meeting ends to poll participants whether they believe a virtual meeting was productive and then identify meeting characteristics of that particular meeting if it was rated as productive by a majority of participants. In particular embodiments, the computing system may be able to identify predetermined criteria associated with unproductive virtual meetings, such as virtual meetings where the rate of conversational turns is low. In particular embodiments, the computing system may set certain values of meeting characteristics to achieve or limit for a virtual meeting. As an example and not by way of limitation, the computing system may set a number of a rate of interruptions as a threshold number to achieve or limit. For instance, the computing system may set to limit the rate of interruptions to below ten times for a virtual meeting. There may be a trigger condition according to a predetermined criteria. As an example and not by way of limitation, a predetermined criteria may identify a number of interruptions in a virtual meeting above five interruptions may require an action to reduce the likelihood of another interruption occurring. In the scenario where the computing system is attempting to reduce the likelihood of another interruption occurring, the computing system may determine that an indication that a particular virtual meeting participant is interrupting another virtual meeting participant would reduce the likelihood of another interruption. The computing system may determine other actions to achieve a goal (e.g., reduce likelihood of an interruption, increase conversational turns, and the like).

In particular embodiments, the one or more predetermined criteria may comprise a rate of conversational turns is below a threshold rate within a predetermined time period, a participant is talking for a time that is greater than a predetermined time period, a rate of interruptions exceeds a threshold number of interruptions, and a communal sentiment state is a predetermined communal sentimental state is a predetermined communal sentiment state. In particular embodiments, the computing system may be configured to determine an action to perform to improve one or more meeting characteristics once one of the predetermined criteria has been met. As an example and not by way of limitation, when the rate of conversational turns is below a threshold rate within a predetermined time period, the computing system may determine that the action is to display an indication requesting participation from one or more virtual meeting participants that have not talked for a threshold time period within the predetermined time period. For instance, if each participant of the virtual meeting is wearing an artificial reality system, then the computing system may identify the virtual meeting participant that has not talked recently and determine that an action is to send a text notification to display in their view (e.g., a text pop up in a virtual reality environment or augmented reality environment) requesting the user to contribute to the conversation. As another example and not by way of limitation, when a participant is talking for a time that is greater than a predetermined time period, the computing system may determine that the action is to display an indication requesting the participant talking to call on another virtual meeting participant to talk. For instance, the computing system may determine that the action is to send a notification to the virtual meeting participant that is talking that the participant has talked for a threshold amount of time and should encourage other participants to talk. As another example and not by way of limitation, when a rate of interruptions exceeds a threshold number of interruptions, the computing system may determine the action is to display an indication notifying participants that another participant is in the middle of a sentence. For example, the computing system may determine the action is to display a text notification indicating that one of the participants is in the middle of a sentence/talking. As another example and not by way of limitation, when the communal sentimental state is a predetermined sentimental state and/or if the value of the communal sentimental state falls below a threshold communal sentimental state value, the computing system may determine the action is to display an indication to improve the communal sentimental state. For instance, if the computing system may determine that the participants are getting upset or angry based on their communal sentimental state and determine that the action is to interject with advice that getting frustrated with other participants may be detrimental to the productivity of the virtual meeting. In particular embodiments, the computing system may determine the action is to alter an artificial environment associated with the virtual meeting. In particular embodiments, altering the artificial environment associated with a virtual meeting may comprise one or more of changing a virtual reality environment associated with the virtual meeting, display one or more augmented reality elements to an augmented reality environment associated with the virtual meeting, and displaying an avatar associated with the virtual meeting. As an example and not by way of limitation, the computing system may add a color to the artificial environment (e.g., make the room slightly blue), which may not be immediately noticeable but may be able to provide a more calming environment. As another example and not by way of limitation, the computing system may change the background of the virtual meeting to be a more relaxing environment, such as a beach. As another example and not by way of limitation, the computing system may display an avatar representing a virtual meeting facilitator (e.g., a visual representation of the computing system or an assistant system) for virtual meeting participants to interact with. The users may request the virtual meeting facilitator to accomplish various tasks.

In particular embodiments, the computing system may generate an instruction for performing an action. After the computing system determines an action to perform to improve one or more meeting characteristics, the computing system may generate instructions to perform the action. As an example and not by way of limitation, the computing system may generate instructions for the artificial reality systems to perform the action, such as displaying a notification to the user, changing the artificial reality environment, displaying an avatar, and the like. In particular embodiments, the instructions may be configured to cause an application running on each of the plurality of artificial reality systems that receives the instruction to perform the action corresponding to the instruction.

In particular embodiments, the computing system may send the instruction to one or more artificial reality systems corresponding to a respective participant of a virtual meeting. In particular embodiments, the computing system may send instructions to all artificial reality systems associated with participants of a virtual meeting to perform an action. As an example and not by way of limitation, the computing system may send instructions to all artificial reality systems to display an avatar. In particular embodiments, the computing system may identify a meeting leader associated with a virtual meeting. As an example and not by way of limitation, a person may be designated as a team leader among the virtual meeting participants. The designation may be based on whether the team leader initiated the virtual meeting or is a host of the virtual meeting or the host may designate one of the participants as a team leader/meeting leader. In particular embodiments, the computing system may send the instruction to the artificial-reality system associated with the meeting leader. As an example and not by way of limitation, if the computing system has determined an action to improve a meeting characteristic, the computing system may display a text notification for the meeting leader to implement the action (e.g., request other participants to contribute to the conversation, request a participant to let other participants contribute, and the like).

In particular embodiments, the computing system may receive information corresponding to the virtual meeting comprising one or more meeting parameters. As an example and not by way of limitation, the computing system may receive a time, a date, an agenda, and the like associated with the virtual meeting. In particular embodiments, the computing system may generate one or more premeeting items that includes a virtual meeting agenda, a virtual meeting task list, or a virtual meeting invitation based on information corresponding to the virtual meeting. As an example and not by way of limitation, a host or an initiator of a virtual meeting may provide a list of names for a virtual meeting invitation list, one or more discussion topics, tasks, meeting points, and the like to the computing system. In particular embodiments, the computing system may send out one or more premeeting items to the artificial reality systems associated with the listed virtual meeting participants. In particular embodiments, the computing system may identify one or more action items for a virtual meeting based on the one or more premeeting items. As an example and not by way of limitation, the computing system may use information from an agenda to identify one or more action items, such as discussion points of a virtual meeting. In particular embodiments, the computing system may track the one or more action items for a virtual meeting based on one or more meeting parameters. As an example and not by way of limitation, the computing system may determine that the virtual meeting is for one hour based on meeting parameters and identify six action items to be accomplished for the meeting. The computing system may estimate that each action item has about ten minutes to be accomplished. In particular embodiments, the information corresponding to the virtual meeting may provide information corresponding to how much time is allotted to each action item. In particular embodiments, the computing system may generate instructions for presenting an indication of one or more action items based on the tracking of the action items for the virtual meeting. As an example and not by way of limitation, the computing system may generate instructions to notify participants of a virtual meeting of a time remaining to finish an action item and/or other action items on the agenda. The computing system may send the instructions for presenting the indication to each artificial reality system corresponding to the participants of the virtual meeting. In particular embodiments, the computing system may identify one or more post meeting action items for the virtual meeting based on the input data from artificial reality systems of a virtual meeting. As an example and not by way of limitation, the virtual meeting may receive an audio input from one or more participants indicating to schedule another virtual meeting. For instance, a participant may say "Ok, let's follow up tomorrow at 3 to go over the results" and the computing system may determine that the participant meant to schedule another virtual meeting for tomorrow at 3 PM. As another example and not by way of limitation, the computing system may generate meeting notes and summary to distribute to the virtual meeting participants. In particular embodiments, the computing system may determine a meeting scorecard that is an evaluation of the virtual meeting to present to one or more participants of the virtual meeting. The meeting scorecard may be sent to the meeting leader. The meeting scorecard may identify one or more meeting characteristics that may improve or that were satisfactory during the virtual meeting. As an example and not by way of limitation, the computing system may identify that there was a moderate rate of interruptions during the virtual meeting. In particular embodiments, the computing system may send instructions to one or more artificial reality systems associated with participants of a virtual meeting to present the one or more post meeting action items.

In particular embodiments, the computing system may request authorization from each participant of a virtual meeting to operate during the virtual meeting. In particular embodiments, the computing system may identify one or more privacy settings associated with a participant of a virtual meeting to determine whether the computing system has authorization to operate during a virtual meeting. In particular embodiments, one or more participants may perform an action to modify the operation of the computing system during a virtual meeting. As an example and not by way of limitation, a meeting participant may request (e.g., through a user input, such as an audio input or another input such as a virtual activatable element) that the computing system stop one or more functionalities. For instance, if an action item tracking functionality is interrupting the participants of the virtual meeting, the participants may request the computing system to turn off the functionality for the virtual meeting. As an example and not by way of limitation, one or more participants may request the computing system to stop all functionalities during the virtual meeting so the participants of the virtual meeting may operate without the computing system. In particular embodiments, the computing system may present the request prior to initiating the virtual meeting. In particular embodiments, the computing system may operate based on limited authorization from participants of a virtual meeting. As an example and not by way of limitation, the computing system may only receive user inputs from participants of a virtual meeting that approved the authorization request to operate within the virtual meeting.

In particular embodiments, a machine-learning model may be trained to identify features of productive virtual meetings. Training data may comprise example virtual meetings where multiple participants interact through various scenarios. Predictions may be made on determined meeting characteristics, such as a communal sentimental state and an evaluator may provide ground truth data corresponding to a communal sentimental state for various points of the virtual meeting. As an example and not by way of limitation, the machine-learning model may predict that when meeting participants have higher tones of voices, that participants are angry, and an evaluator may confirm or modify the evaluation. For example, if the meeting participants are excited, the evaluator may provide that data. Additionally, meeting participants may provide feedback to the machine-learning model. As an example and not by way of limitation, the meeting participant may indicate how they were feeling through the virtual meeting. In particular embodiments, the meeting participants may indicate whether one or more actions performed by a computing system to improve meeting characteristics (e.g., rate of interruptions) helped or not. The feedback may be used to improve upon the computing system's determination of which actions may improve meeting characteristics and/or the computing system's evaluation of the meeting characteristics.

Referring to FIG. 1, an example virtual meeting environment 100 including an assistant system 102 is shown. The virtual meeting environment 100 may comprise the assistant system 102, and a plurality of client systems 104a-104c connected through a network 106. In particular embodiments, each client system 104 may comprise one or more sensors 108. Although FIG. 1 illustrates three client systems 104, the virtual meeting environment 100 may comprise more or less client systems 104. In particular embodiments, the assistant system 102 may be a computing system as described herein to perform various functionalities during a virtual meeting. As an example and not by way of limitation, the assistant system 102 may respond to one or more queries from one or more participants of the virtual meeting associated with the client systems 104. For example, a participant may request the assistant system 102 "What day is Memorial Day?" through their respective client system 104. The assistant system 102 may process the user input and provide a response. As another example and not by way of limitation, the assistant system 102 may help facilitate a virtual meeting by tracking action items, improving meeting characteristics, and other functionalities as described herein.

In particular embodiments, a client system 104 may be an electronic device including hardware, software, or embedded logic components or a combination of two or more such components and capable of carrying out the appropriate functionalities implemented or supported by a client system 104. As an example and not by way of limitation, a client system 104 may include a computer system such as a desktop computer, notebook or laptop computer, netbook, a tablet computer, e-book reader, GPS device, camera, personal digital assistant (PDA), handheld electronic device, cellular telephone, smartphone, artificial reality headset and controllers, other suitable electronic device, or any suitable combination thereof. This disclosure contemplates any suitable client systems 104. A client system 104 may enable a network user at a client system 104 to access a network 106. A client system 104 may enable its user to communicate with other users at other client systems 104. A client system 104 may generate an artificial reality environment for a user to interact with content. As an example and not by way of limitation, the client system 104 may generate a virtual reality environment or an augmented reality environment to represent a virtual meeting and present that to a user. In particular embodiments, the client system 104 may comprise one or more sensors 108 to receive user input. In particular embodiments, the sensors 108 may comprise one or more of cameras, accelerometers, gyroscopes, microphones, and other sensors. In particular embodiments, a user may initiate a virtual meeting with other users through client system 104. As an example and not by way of limitation, the client system may execute an application that initiates a virtual meeting and send links to other client systems 104 to join the virtual meeting. In particular embodiments, the selection of the link may generate an artificial reality environment with the respective client system 104 to present the virtual meeting to the user.

This disclosure contemplates any suitable network 106. As an example and not by way of limitation, one or more portions of a network 106 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. A network 106 may include one or more networks 106.

Figure 2:
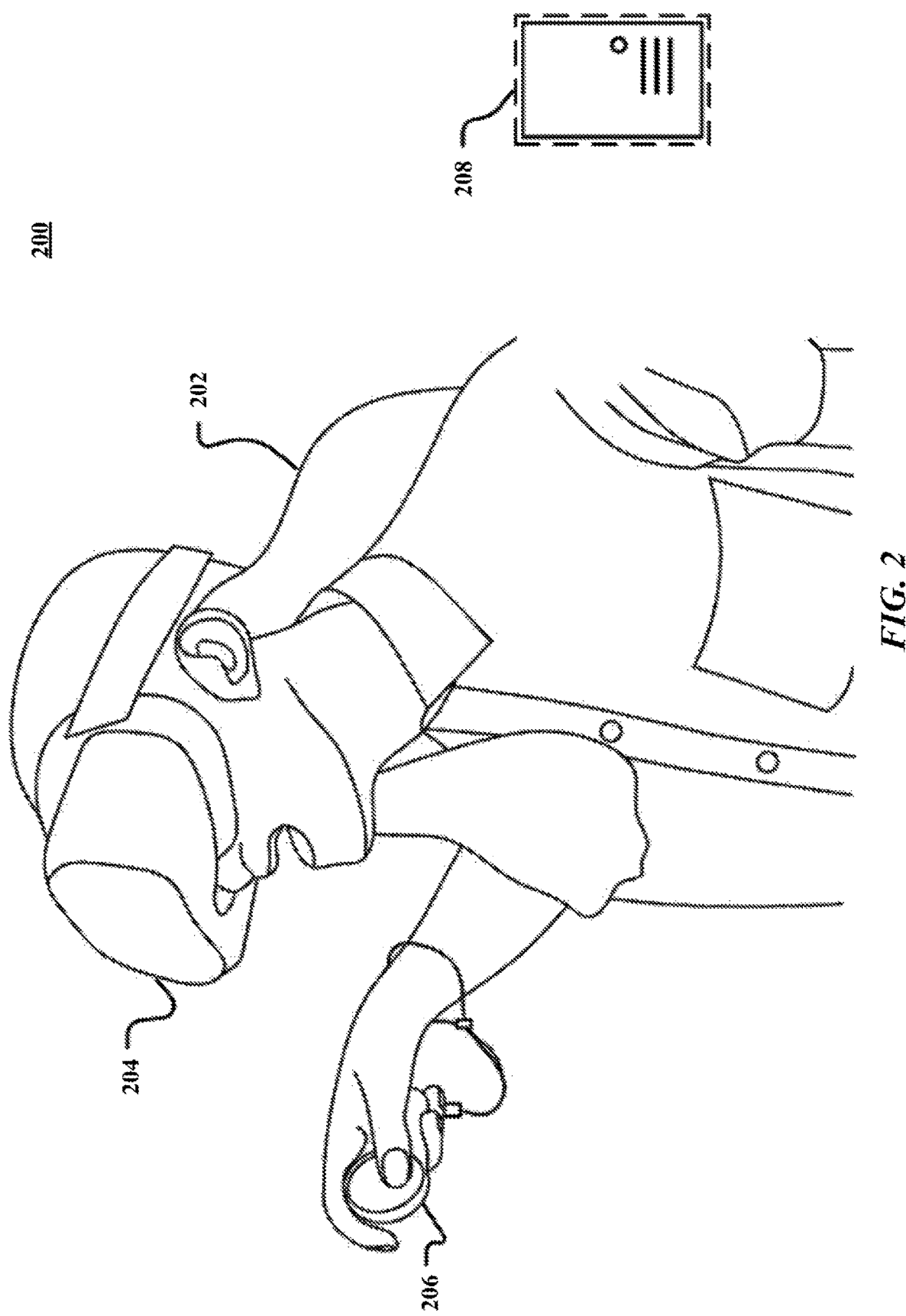
FIG. 2 illustrates an example artificial reality system.

FIG. 2 illustrates an example artificial reality system 200. In particular embodiments, the artificial reality system 200 may comprise a headset 204, a controller 206, and a computing system 208. A user 202 may wear the headset 204 that may display visual artificial reality content to the user 202. The headset 204 may include an audio device that may provide audio artificial reality content to the user 202. As an example and not by way of limitation, the headset 204 may display visual artificial content and audio artificial reality content corresponding to a virtual meeting. The headset 204 may include one or more cameras which can capture images and videos of environments. The headset 204 may include a plurality of sensors to determine a head pose of the user 202. The headset 204 may include a microphone to receive audio input from the user 202. The headset 204 may be referred as a head-mounted display (HMD). The controller 206 may comprise a trackpad and one or more buttons. The controller 206 may receive inputs from the user 202 and relay the inputs to the computing system 208. The controller 206 may also provide haptic feedback to the user 202. The computing system 208 may be connected to the headset 204 and the controller 206 through cables or wireless connections. The computing system 208 may control the headset 204 and the controller 206 to provide the artificial reality content to and receive inputs from the user 202. The computing system 208 may be a standalone host computer system, an on-board computer system integrated with the headset 204, a mobile device, or any other hardware platform capable of providing artificial reality content to and receiving inputs from the user 202.

Figure 3:
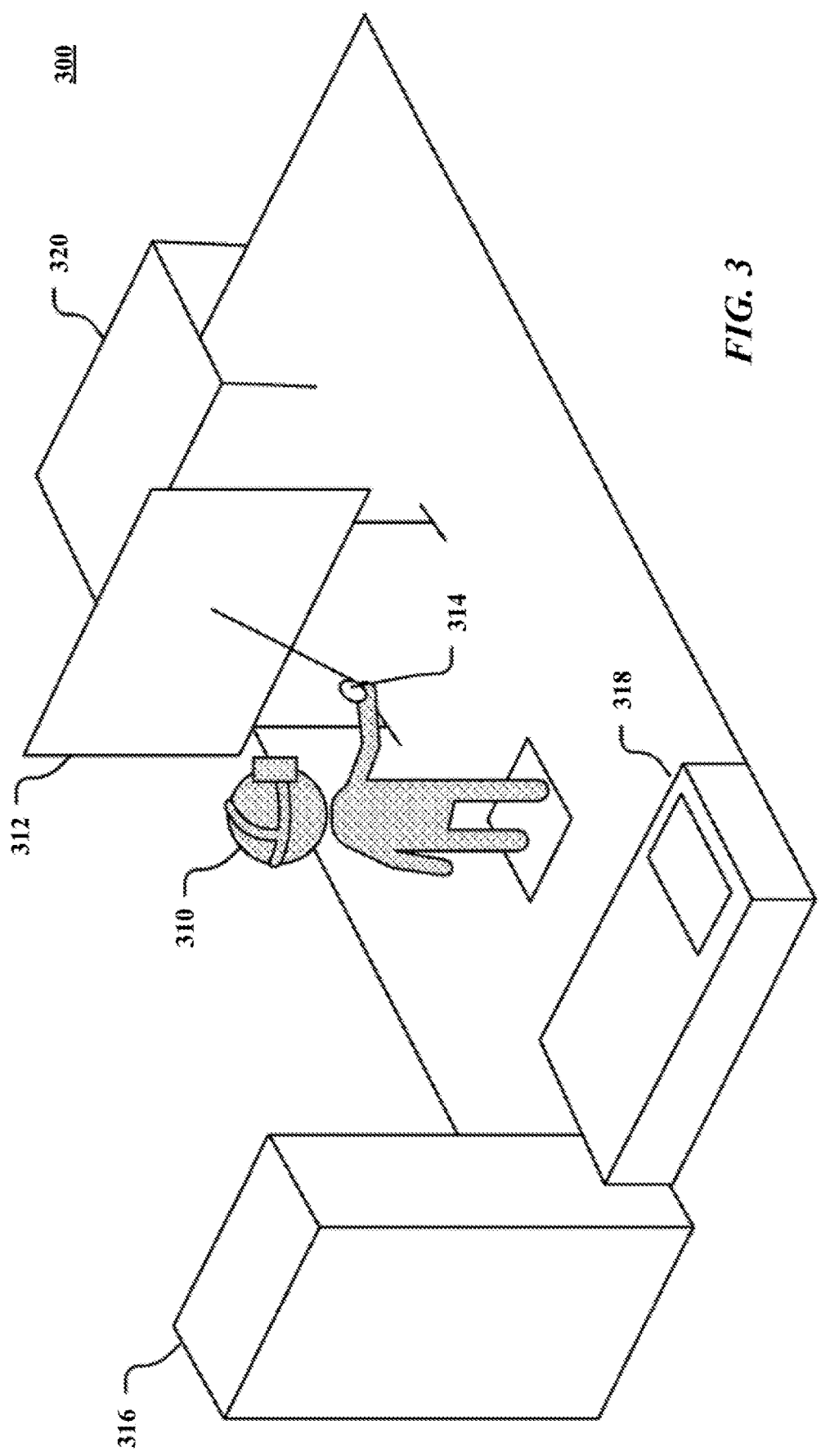
FIG. 3 illustrates a user in an example environment using an artificial reality system to participate in a virtual meeting.

FIG. 3 illustrates a user 310 in an example environment 300 using an artificial reality system to participate in a virtual meeting. As shown in FIG. 3, the user 310 may be interacting with a screen 312 using a device 314. In particular embodiments, the screen 312 may be an artificial reality element generated to be shared with participants of a virtual meeting. The screen 312 may be screen that is connected to an artificial reality system in which any information written on the screen will be copied, saved, and accessible via the system. In addition, as an example, the device 314 may be a physical device that allows the user 310 to interact with the screen 312. As another example, the device 314 may be an electronic device that allows the user 310 to interact with the screen 312 in the virtual world (e.g., controller 206).

In particular embodiments, as shown in FIG. 3, in the area surrounding the user 310, there may also be a bookshelf 316, bed 318, and a desk 320. Among these objects in the room, the artificial reality system may determine that the bookshelf 316 and the bed 318 are not objects that would be designated as objects for sharing information with other users in the artificial reality system. In particular embodiments, the artificial reality system may access the environment surrounding the user 310 to determine the positions, locations, and/or orientations of the bookshelf 316, bed 318, and desk 320, and include these objects in the virtual reality display along with the screen 312. This may provide the users with a more realistic scene and context for the location of the screen 312, so that the users are not just viewing a screen floating in 3D space. In particular embodiments, the example environment 300 may be the virtual meeting environment presented to the user 310. Other environments may be presented to different participants of the virtual meeting. As an example and not by way of limitation, one user 310 may be presented an office virtual environment whereas another user may be presented a living room virtual environment. The background virtual environment may comprise elements that the users cannot interact with, such as the bookshelf 316 or bed 318. As an example and not by way of limitation, the area where the user can interact with may be an area the user can move within (e.g., a virtual box area corresponding to an area where the user may move). In particular embodiments, the same virtual environment may be presented to users for the entire virtual environment and/or the area that users can move within.

Figure 4:
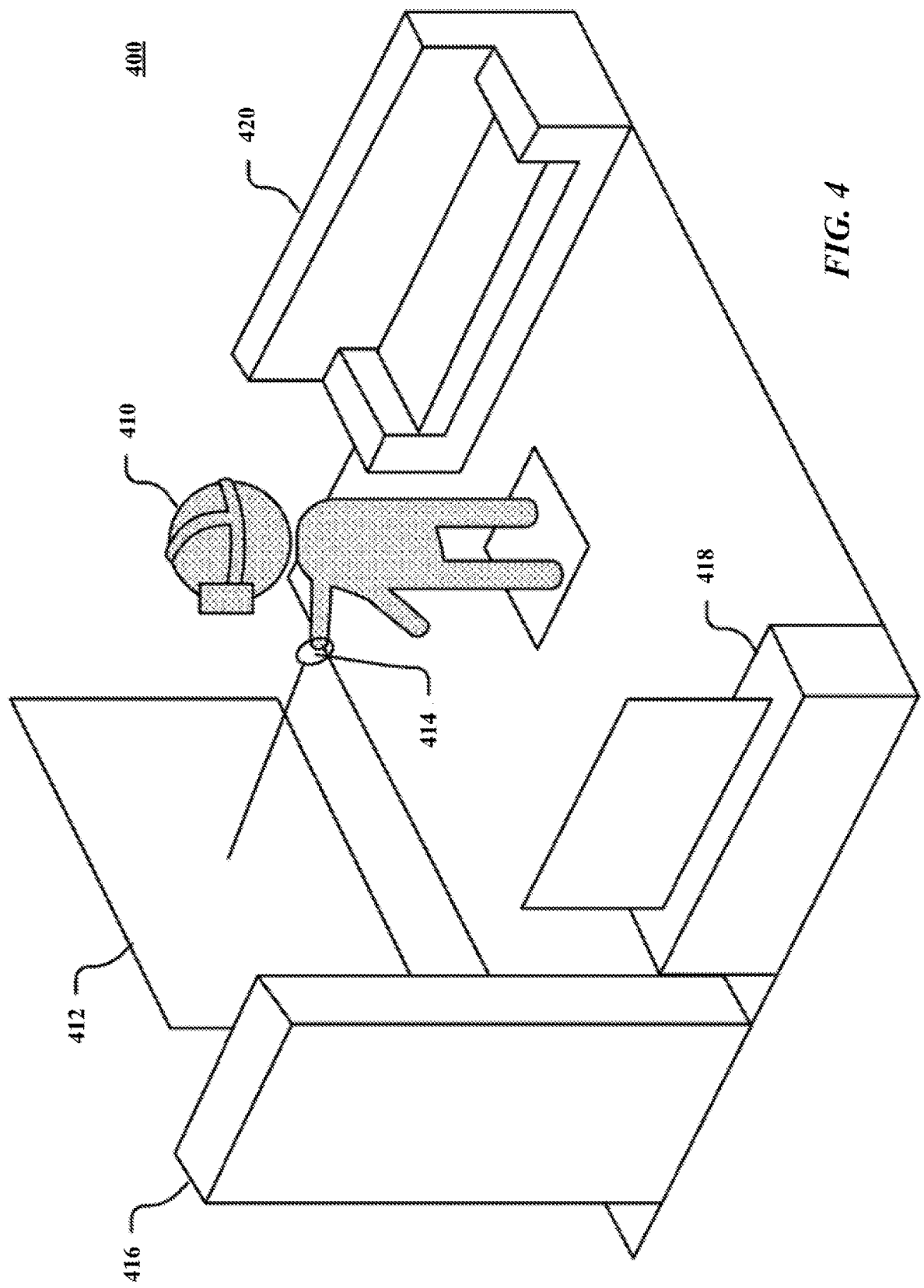
FIG. 4 illustrates a user in another example environment using an artificial reality system to participate in a virtual meeting.

Referring to FIG. 4, another example environment 400 of a user 410 using an artificial reality system to participate in a virtual meeting is shown. The user 410 may be another participant of the virtual meeting with the user 310. As shown in FIG. 4, user 410 may be interacting with a screen 412 using device 414. In particular embodiments, the screen 412 may be an artificial reality element generated to be shared with participants of a virtual meeting. The screen 412 may be a screen that is connected to an artificial reality system in which any information written on the screen will be copied, saved, and accessible via the system. In addition, as an example, the device 414 may be a physical device that allows the user 410 to interact with the screen 412. As another example, the device 414 may be an electronic device that allows the user 410 to interact with the screen 412 in the virtual world (e.g., controller 206).

In particular embodiments, as shown in FIG. 4, in the area surrounding the user 410, there may also be a bookshelf 416, a television stand 418, and a sofa 420. Among these objects in the room, the artificial reality system may determine that the bookshelf 416 and the sofa 420 are not objects that would be designated as objects for sharing information with other users in the artificial reality system. In particular embodiments, the artificial reality system may access the environment surrounding the user 410 to determine the positions, locations, and/or orientations of the bookshelf 416, a television stand 418, and sofa 420, and include these objects in the virtual reality display along with the screen 412. As discussed above, this may provide the users with a more realistic scene and context for the location of the screen 412, so that the users are not just viewing a screen floating in 3D space.

Figure 5:
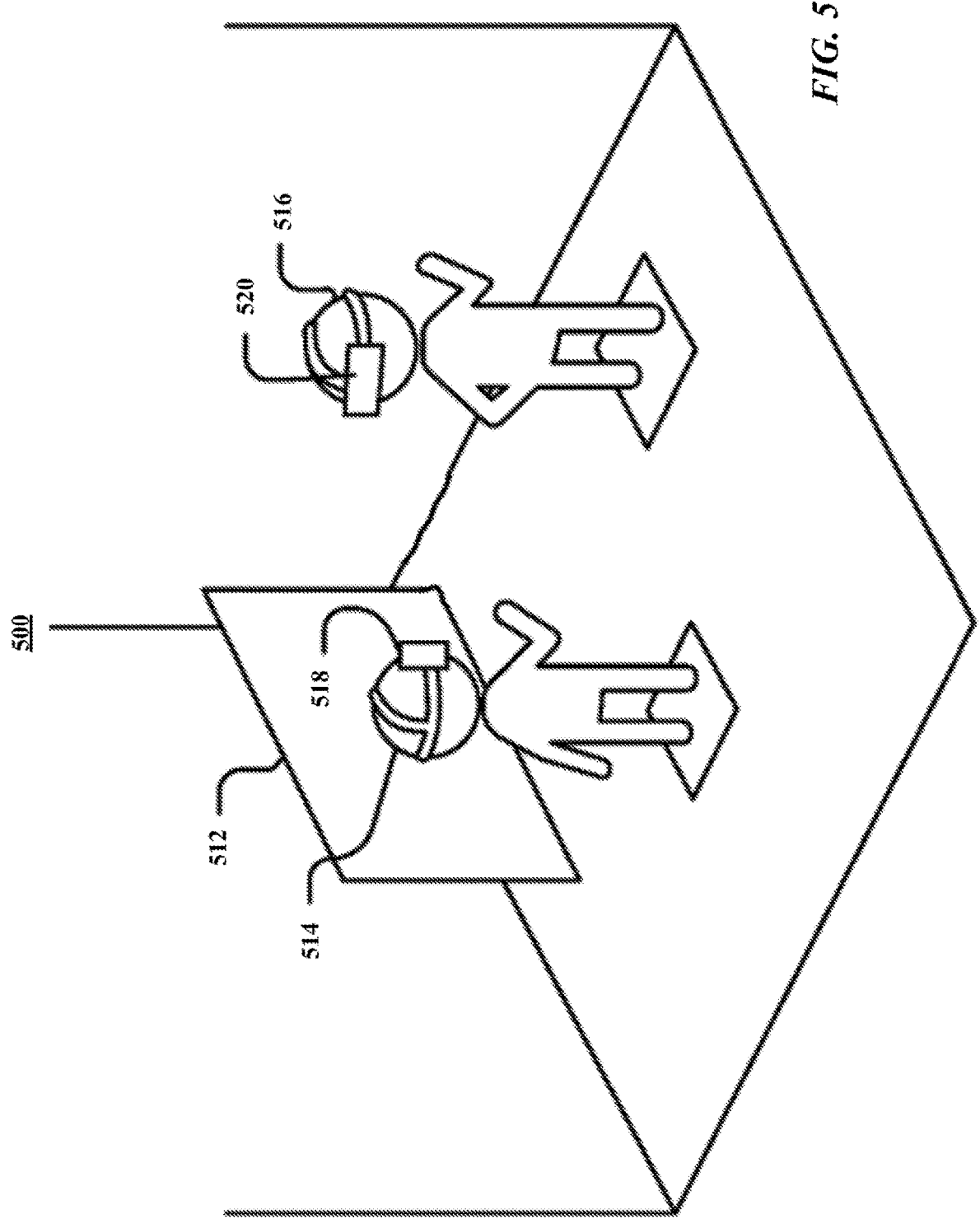
FIG. 5 illustrates an example virtual meeting environment.

FIG. 5 illustrates an example virtual meeting environment 500. In particular embodiments, the virtual meeting environment 500 may be a virtual reality environment where users 514, 516 join the virtual meeting environment 500 as participants through virtual reality headsets 518, 520. In particular embodiments, the virtual meeting environment 500 may be an augmented reality environment where users 514, 516 join through augmented reality headsets 518, 520. While only two users 514, 516 are displayed with headsets 518, 520, any number of users may be included in the virtual meeting environment 500. Additionally, while only one screen 512 is shown, any number of screens 512 may be included in a virtual meeting environment 500. In particular embodiments, a screen 512 may be displayed as an artificial reality object within the virtual meeting environment 500. The screen 512 may be positioned in the same location within the virtual meeting environment to be shown to each of the users 514, 516. In particular embodiments, the screen 512 may be embodied as a dashboard for each headset 518, 520. In particular embodiments, the screen 512 may be associated with an assistant system that helps facilitate the meeting. The screen 512 may also be embodied as a head-up display on each of the users' 514, 516 respective headsets 518, 520. As an example and not by way of limitation, a text box may be shown to each of the users 514, 516 through their headsets 518, 520. In particular embodiments, an assistant system (e.g., assistant system 102) may communicate with the users 514, 516 through their headsets 518, 520 (e.g., client systems 104) by using the screen 512 to display information. As an example and not by way of limitation, if the assistant system determined an action to improve a meeting characteristic required a text message to show the users, then the assistant system may present the text message to each of the users through screen 512. For instance, if the assistant system determines that a user 514 participating in the virtual meeting may be interrupting the other user 516, then the assistant system may determine a text notification to the user 514 may remedy the interruptions. The assistant system may generate a text message, "Please let user 516 finish his sentence before speaking so as to not interrupt him" and send instructions to headset 518 to present the text message to user 514. The assistant system may also send instructions to headset 520 to present the message to notify user 516 of an action performed by the assistant system. The assistant system may also identify a meeting leader and send instructions to the headset associated with the meeting leader to present the text message to only the meeting leader. The screen 512 may be used to display the text message to the user. In particular embodiments, the screen 512 may be an artificial reality element where users may interact with, such as writing on and the like. The assistant system may save the information for the users 514, 516 to review after completion. As an example and not by way of limitation, assistant system may record a process of information being written on the screen 512, so users 514, 516 may see the order at which information was written on the screen 512. The assistant system may interact with the users 514, 516 through other means, such as through haptic, audio, and/or graphic outputs. As an example and not by way of limitation, an audio output may be sent to each headset 518, 520 to present to the users 514, 516. For instance, instead of a text message as discussed above, the assistant system may send an audio output to each user 514, 516.

In particular embodiments, the assistant system may assist the users 514, 516 of the virtual meeting environment 500 with premeeting action items. The assistant system may receive premeeting information from either of the users 514, 516 or another user that sets up the virtual meeting. The premeeting information may include information corresponding to a date and time associated with the virtual meeting, one or more action items, one or more discussion points, a list of participants to join the virtual meeting, and the like. In particular embodiments, the assistant system may generate a meeting agenda and send that to the users 514, 516 prior to the virtual meeting. As an example and not by way of limitation, the assistant system may receive premeeting information corresponding to a list of action items and/or discussion points for the virtual meeting and generate an agenda corresponding to the action items. The assistant system may assign time ranges for each action item. In particular embodiments, the assistant system may identify one or more premeeting materials for each participant to receive. As an example and not by way of limitation, if a virtual meeting host identifies specific reading material for participants of the virtual meeting to read, the assistant system may identify a link associated with the reading material. The assistant system may send one or more premeeting items to each participant of the virtual meeting. In particular embodiments, the one or more premeeting items may be customized for each participant. As an example and not by way of limitation, if one participant is leading the discussion on a topic during a virtual meeting, the participant may be presented with premeeting materials corresponding to that topic. In particular embodiment, the assistant system may access a social-networking profile associated with a participant of a virtual meeting (e.g., user 514, 516) based on privacy settings associated with the participant. The assistant system may use social-networking information to determine the premeeting items to send to the participant. In particular embodiments, the assistant system may send one or more premeeting items to headsets 518, 520 associated with users 514, 516 and/or one or more devices associated with the users 514, 516. As an example and not by way of limitation, the assistant system may send the premeeting items to a smartphone associated with the user 514. In particular embodiments, the assistant system may send the premeeting items to a social-networking profile associated with a participant of a virtual meeting. As an example and not by way of limitation, the assistant system may send a meeting agenda to a social-networking profile associated with the user 514. The user 514 may access the premeeting items by first accessing a social-networking profile. In particular embodiments, the assistant system may send the premeeting items to an application associated with the virtual meeting (e.g., an application to initiate a virtual meeting). In particular embodiments, the assistant system may send an activatable link to each headset 518, 520 of the users 514, 516 for the users 514, 516 to join a virtual meeting. The users 514, 516 may initiate the virtual meeting by accessing (e.g., clicking or selecting) a link to join a virtual meeting. In particular embodiments, the headset 518, 520 may be configured to initiate a virtual meeting and join the virtual meeting if a user 514, 516 is wearing their respective headset 518, 520 when the virtual meeting is scheduled to start. In particular embodiments, the headset 518, 520 may present a request to join a virtual meeting to the user 514, 516 during the start time of the virtual meeting. In particular embodiments, the assistant system may generate reminders for each participant for premeeting action items to complete prior to joining the virtual meeting. As an example and not by way of limitation, an assistant system may send a reminder to read premeeting materials prior to joining the virtual meeting. The reminder may be sent based on the premeeting materials that need to be completed. As an example and not by way of limitation, the assistant system may send a reminder to read premeeting materials one hour before a meeting starts if the premeeting material includes one page of material to read, but may send it four hours in advance if there is significantly more material to read.

In particular embodiments, the premeeting information may include a theme to set for the virtual meeting. As an example and not by way of limitation, a theme may be representative of the virtual meeting environment 500. For example, if an office theme is selected, the virtual meeting environment 500 may be set to include a visual office environment. Additionally, the theme may further be selected corresponding to the participants of the virtual meeting. As an example and not by way of limitation, if each participant of the virtual meeting is from the United States, each participant may be presented with a similar office environment for the virtual meeting environment 500. However, if one participant of the virtual meeting is from Japan and another participant of the virtual meeting is from France, then an office environment may be presented that would be a neutral environment for all of the participants of the virtual meeting. Alternatively, each participant may be presented with a different virtual meeting environment 500 corresponding to their respective backgrounds. As an example and not by way of limitation, one user 514 may be presented with an office environment representative of an office found in California for the virtual meeting environment 500 and another user 514 may be presented with an office environment representative of an office found in New York for the virtual meeting environment 500. One or more portions of the virtual meeting environment 500 may be different based on the participant of the virtual meeting. As an example and not by way of limitation, a center area of the virtual meeting environment 500 where each participant (e.g., user 514, 516) can walk and interact with artificial reality objects may be the same, and the background of the virtual meeting environment 500 where users 514, 516 cannot touch may be different.

In particular embodiments, the assistant system may perform one or more meeting functions. As described above, based on privacy settings and authorization received from users 514, 516, the assistant system may perform one or more meeting functions. In particular embodiments, the meeting functions may include one or more of managing time of a virtual meeting, improve one or more meeting characteristics, facilitate transitions, tracking action items, managing virtual screen 512, facilitate team building activities. As an example and not by way of limitation, the assistant system may indicate a time left of the virtual meeting. This may be displayed on the virtual screen 512. As another example and not by way of limitation, the assistant system may list action items or an agenda on the virtual screen that may be marked off by one of the users 514, 516 once they have been completed. In particular embodiments, one or more users 514, 516 may adjust the virtual meeting parameters (e.g., a time, a virtual meeting environment, an agenda) of the virtual meeting. The assistant system may receive inputs from each of the users 514, 516 through the headsets 518, 520 and other devices (e.g., controllers and the like). The assistant system may determine meeting characteristics based on the input data as described herein. The assistant system may improve one or more meeting characteristics based on a determination of an action configured to improve one or more meeting characteristics as described herein. As an example and not by way of limitation, the assistant system may determine that one user 514 is frequently interrupting the user 516. To address this and reduce a rate of interruptions, the assistant system may generate a text notification for the user 514 to wait until user 516 is done talking. The assistant system may present the text notification to the user 514 by sending instructions to the headset 518 of the user 514 to present the text notification. The text notification may be presented on the screen 512 for the user 514 and/or user 516 to see. The assistant system may determine whether one or more meeting characteristics have improved based on an action performed and determine one or more further actions to perform to improve meeting characteristics. As another example and not by way of limitation, the assistant system may determine whether a text notification notifying the user 514 that he is interrupting user 516 has improved the meeting characteristic (e.g., lower rate of interruptions). If the assistant system determines that the text notification has not helped, the assistant system may determine another action and send instructions to perform the action to one or more headsets 518, 520. As an example and not by way of limitation, the assistant system may determine that one user 514 is being verbally abusive or threatening to user 516 (e.g., from content of speech from audio input from user 514) and determine that muting the user 514 while another user 516 is talking may improve the rate of interruptions (by reducing interruptions) and send instructions to one or more headsets 518, 520 to mute the user 514. As another example and not by way of limitation, the assistant system may track action items during a virtual meeting. The assistant system may determine a content of speech from audio input from each participant and determine whether the users 514, 516 have moved onto another action item. The tracking of the action items may be shown by the virtual screen 512, such as identifying which action items the users 514, 516 are currently discussing. Additionally, the tracking of the action items may be shown as a separate text box individually for each headset 518, 520. The assistant system may notify users 514, 516 to move onto another action item if the assistant system has determined that the users 514, 516 have spent a threshold time on the current action item based on the agenda and premeeting information (e.g., time allotted for each action item). As an example and not by way of limitation, the assistant system may send instructions to the headsets 518, 520 to present a text notification to the users 514, 516 to move onto the next action item. The assistant system may manage virtual whiteboards for the virtual meeting. As an example and not by way of limitation, the assistant system may record information written on a virtual whiteboard to share with the meeting participants after conclusion of the virtual meeting. The assistant system may identify opportune times where team building activities may be inserted into a virtual meeting. As an example and not by way of limitation, if one or more virtual meeting participants (e.g., user 514, 516) is late to the virtual meeting, the assistant system may identify that as a time for team building activities with two or more users 514, 516. As another example and not by way of limitation, if the users 514, 516 have been in a virtual meeting for more than two hours, the assistant system may identify that the users 514, 516 may need a break. The assistant system may initiate a team building activity with two or more users 514, 516 in the virtual meeting. As an example and not by way of limitation, the assistant system may initiate a game of virtual catch with users 514, 516. Other activities may be initiated based on the users 514, 516. As an example and not by way of limitation, if the assistant system has access to social-networking information of the users 514, 516, the assistant system may determine what types of games and activities the users 514, 516 may enjoy for a team building activity. For instance, if both users 514, 516 enjoy trivia, the assistant system may initiate a game of trivia where both users 514, 516 are on the same team.

In particular embodiments, the assistant system may alter the virtual meeting environment 500. As an example and not by way of limitation, the assistant system may add one or more artificial reality elements, change the virtual meeting environment 500, and the like. The assistant system may alter the environment in response to determining an action to improve a meeting characteristic may require a change in the virtual meeting environment 500. As an example and not by way of limitation, if the assistant system determines one user is getting aggravated during the virtual meeting, the assistant system may change the environment, such as subtly altering the color of the environment to provide a more relaxing environment or change the background of the virtual meeting environment 500 entirely to provide a relaxing environment. In particular embodiments, the assistant system may determine a communal sentimental state associated with the users 514, 516. As an example and not by way of limitation, based on determined individual behavioral characteristics, such as content of speech, tone of voice, prosody, head pose, gaze, eye movements, body movements, and facial expressions, the assistant system may determine that the users 514, 516 are aggravated. For instance, if the one user has a raised tone of voice with an upset facial expression, then the assistant system may determine that user may be aggravated. The assistant system may respond by determining an action to improve a meeting characteristic (e.g., the communal sentimental state) as described herein. In particular embodiments, the assistant system may alter the virtual meeting environment 500 based on a communal sentimental state. For example the assistant system may alter the color of the virtual meeting environment 500 to a blue if everyone is relaxed during the virtual meeting and change it to a slight red if anyone is getting aggravated so other users 514 or 516 may detect a change in determined communal sentimental state.

In particular embodiments, the assistant system may perform one or more post-meeting actions. Post-meeting actions may include one or more of communicating one or more post-meeting action items, delivering a meeting scorecard to a meeting leader and/or individual participants (e.g., users 514, 516), provide meeting notes and summary, and scheduling another virtual meeting. In particular embodiments, the assistant system may identify one or more post-meeting action items. As an example and not by way of limitation, the assistant system may identify based on audio inputs from users 514, 516, that a document needs to be sent out following the meeting and generate a post-meeting action item for the responsible user 514 or 516 to send out a document following the virtual meeting. In particular embodiments, the assistant system may send a meeting scorecard indicative of a meeting score for the participants of the virtual meeting. The meeting scorecard may indicate one or more meeting characteristics that the participants did well on and may need to improve upon. As an example and not by way of limitation, if the assistant system determines that several actions were needed to reduce the rate of interruptions, the assistant system may include that in a meeting scorecard that rate of interruptions were high for the virtual meeting and ways to improve upon the rate of interruptions for the next virtual meeting. The meeting scorecard may be sent to a meeting leader and/or individual participants, such as the individual or individuals that influenced a meeting characteristic. In particular embodiments, the assistant system may provide meeting notes and summary based on the content of the virtual meeting. As an example and not by way of limitation, if users 514, 516 interacted with a virtual whiteboard, then the assistant system may record the information to share back with the users 514, 516. In particular embodiments, the assistant system may schedule a follow-up virtual meeting if another meeting was discussed during the virtual meeting. As an example and not by way of limitation, if a user 514 mentions needing more time to discuss a topic with user 516 in a follow-up meeting, then the assistant system may determine another meeting may be needed. The assistant system may use information (e.g., users 514, 516 schedules) to identify a time to schedule a future virtual meeting. The assistant system may send links to the future virtual meeting to the users 514, 516 that will participate in the next virtual meeting.

Figure 6:
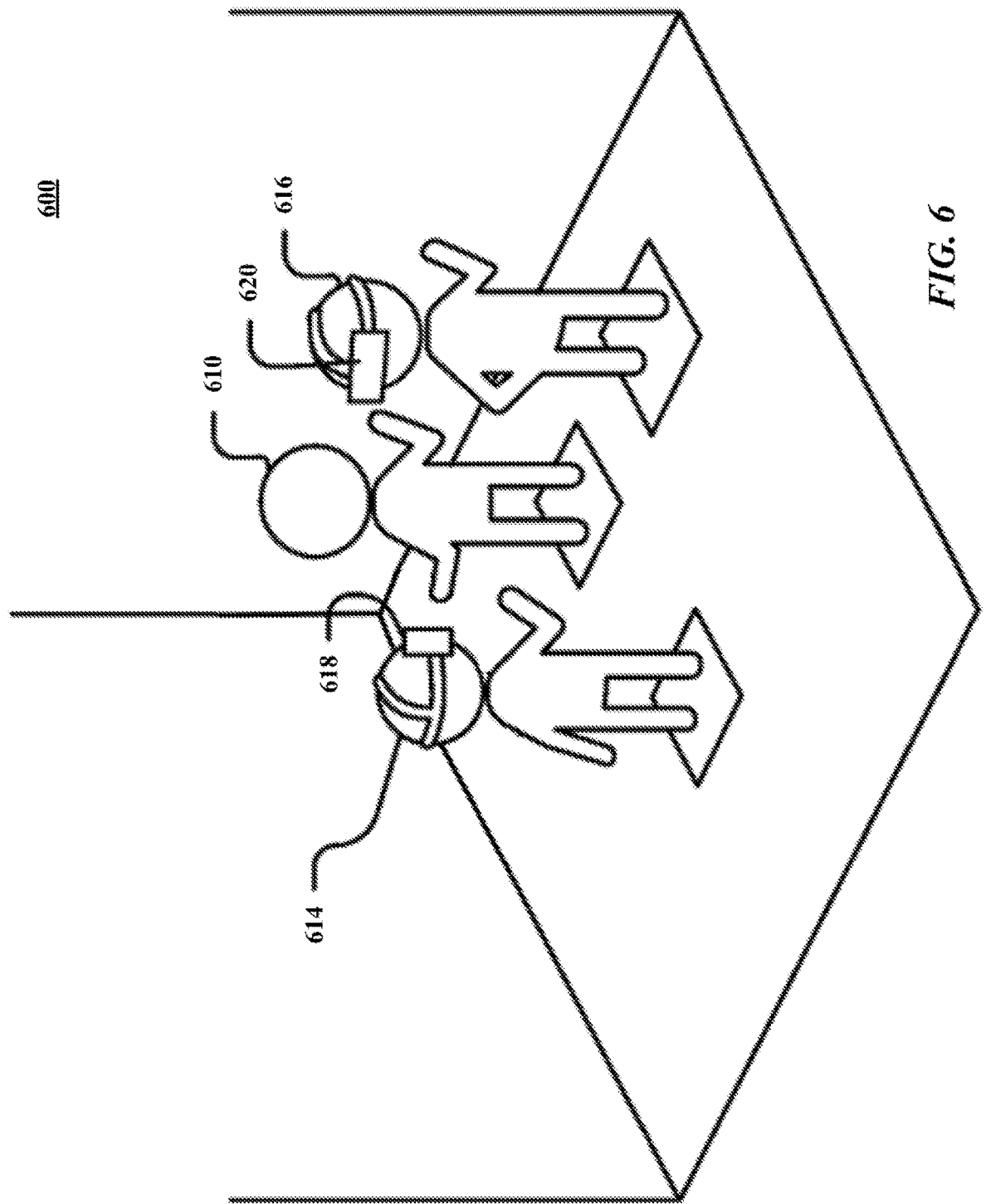
FIG. 6 illustrates another example virtual meeting environment.

Referring to FIG. 6, another example virtual meeting environment 600 is shown. Similarly to FIG. 5, the virtual meeting environment 600 may be a virtual reality environment where users 614, 616 join the virtual meeting environment 600 as participants through headsets 618, 620. Instead of a screen 512 to represent information from an assistant system to the users 514, 516, an avatar 610 is generated to represent the assistant system. The avatar 610 may perform similar functions as described herein by the assistant system. The avatar 610 may be a virtual representation of the assistant system to present an entity to the users 614, 616 to interact with within the virtual meeting. In particular embodiments, the avatar 610 may be the same for each user 614, 616. In particular embodiments, the avatar 610 may be different for each user 614, 616. As an example and not by way of limitation, the avatar 610 may be selected by each user 614, 616 to represent an assistant system. In particular embodiments, the avatar 610 may present information requested by the users 614, 616 through audio outputs that the users 614, 616 receive through their headsets 618, 620. The avatar 610 may perform actions to facilitate the virtual meeting similarly as the assistant system described herein. As an example and not by way of limitation, the assistant system may determine an action to improve a meeting characteristic and send instructions to headsets 618, 620 to make the avatar 610 perform an action to be displayed to the users 614, 616. For example, the assistant system may determine one user 614 is dominating the discussion (e.g., speaking most of the time) during the virtual meeting and may determine to request the other user 616 to contribute to the conversation. The assistant system may send instructions to both headsets 618, 620 to initiate an action by the avatar 610, such as the avatar 610 interjecting into the conversation and requesting the user 616 to provide some discussion. In particular embodiments, the avatar 610 may change to improve one or more meeting characteristics. As an example and not by way of limitation, the avatar 610 may change to be a dog to improve the communal sentimental state. In particular embodiments, the avatar 610 may be embodied as a light. In particular embodiments, when the avatar 610 speaks, subtitles may be displayed to the users 614, 616 on their headsets 618, 620 to transcribe what the avatar 610 is saying. In particular embodiments, the assistant system may use a position of the users 614, 616 to determine an optimal position of the avatar 610 and may send instructions to the headsets 618, 620 to move the avatar 610 in response to other users 614, 616 moving within the virtual meeting environment 600.

Figure 7:
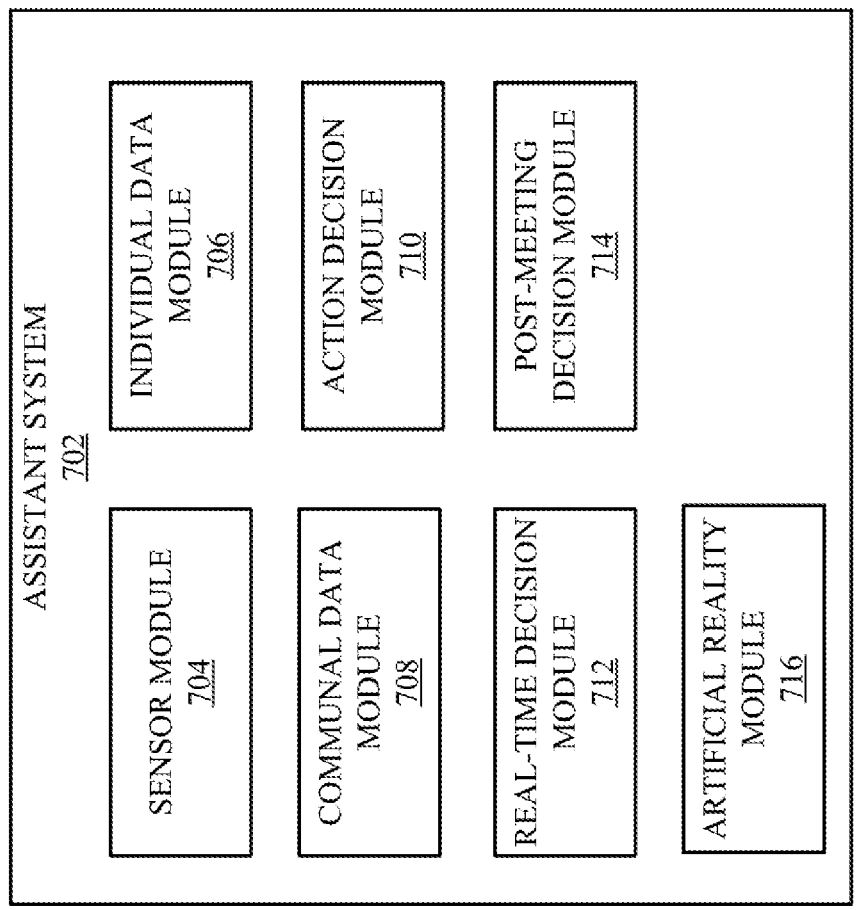
FIG. 7 illustrates an example assistant system.

FIG. 7 illustrates an example assistant system 702 of a virtual meeting environment 700. In particular embodiments, the assistant system 702 may be embodied as a computing device. In particular embodiments, the assistant system 702 may interface one or more client systems (e.g., headsets of users) as described herein. In particular embodiments, the assistant system 702 may comprise a sensor module 704, an individual data module 706, a communal data module 708, an action decision module 710, a real-time decision module 712, a post-meeting decision module 714, an artificial reality module 716, and other modules to help facilitate managing a virtual meeting environment. The assistant system 702 may have similar functionalities as the assistant system and computing device described herein.

In particular embodiments, the sensor module 704 may interface one or more client systems in a virtual meeting environment 700 to receive sensor data. As an example and not by way of limitation, the assistant system 702 may be coupled to client systems (e.g., headsets) to receive microphone data for audio inputs, camera data for visual inputs, and other sensor data (e.g., accelerometer data to determine a head pose). The sensor module 704 may determine user input data received by the assistant system 702. The sensor module 704 may send the user input data to the other modules of assistant system 702. As an example and not by way of limitation, the sensor module 704 may send the user input data to the individual data module 706 and the communal data module 708. In particular embodiments, the sensor module 704 may differentiate the user input data received from one client system over another client system.

In particular embodiments, the individual data module 706 may determine one or more individual behavioral characteristics for each participant in a virtual meeting based on the received user input data. In particular embodiments, the individual data module 706 may determine a content of speech, a tone of voice, a prosody, head pose, a gaze, eye movements, body movements, and facial expression of a participant of the virtual meeting based on the user input data received from a client system. As an example and not by way of limitation, the individual data module 706 may receive audio data from a client system and perform natural language processing to determine a content of speech, such as what the participant associated with the client system is saying, topics associated with the content, and the like. As another example and not by way of limitation, the individual data module 706 may use the received audio data and determine a tone of voice of the user and a prosody of the user. As another example and not by way of limitation, the individual data module 706 may determine a head pose from accelerometer data from the client system and other sensor data. As another example and not by way of limitation, the individual data module 706 may use camera data, such as from inside-out cameras of the client system to determine a gaze, eye movements, and facial expression of the participant. As another example and not by way of limitation, the individual data module 706 may determine a body movement of the participant from camera data and accelerometer data received from the client system, such as accelerometer data from a headset and one or more controllers. In particular embodiments, the individual data module 706 may send the determined individual behavioral characteristics to other modules of the assistant system 702. As an example and not by way of limitation, the individual data module 706 may send the determined individual behavioral characteristics to the communal data module 708.

In particular embodiments, the communal data module 708 may determine one or more communal characteristics of a virtual meeting. The communal data module 708 may use the determined individual behavioral characteristics and user input data to determine the one or more communal characteristics of the virtual meeting. In particular embodiments, the communal data module 708 may determine a rate of conversational turns, speaker dominance, rate of interruptions, and a communal sentimental state. As an example and not by way of limitation, the communal data module 708 may use audio data to determine when a speaker changes which may indicate a conversational turn. As another example and not by way of limitation, the communal data module 708 may use individual behavioral characteristics and audio data to determine a speaker dominance from a participant speaking for a predetermined time. As another example and not by way of limitation, the communal data module 708 may use audio data and determined individual behavioral characteristics to identify a participant being interrupted. For example, when a participant is in the middle of their sentence based on content of speech and prosody and another user begins speaking, the communal data module 708 may identify that as an interruption. As another example and not by way of limitation, the communal data module 708 may use determined individual behavioral characteristics and user input data to determine a communal sentimental state, such as the facial expression, body movements, and tone of voice of participants may indicate how one or more participants are feeling. In particular embodiments, the communal data module 708 may use a machine-learning model to determine one or more of the communal characteristics of the virtual meeting. In particular embodiments, the communal data module 708 may send determined communal characteristics of the virtual meeting to one or more modules of the assistant system 702. As an example and not by way of limitation, the communal data module 708 may send the determined communal characteristics to the action decision module 710, the real-time decision module 712, and the post-meeting decision module 714.

In particular embodiments, the action decision module 710 may determine one or more action items for a virtual meeting. The action decision module 710 may receive premeeting information indicative of virtual meeting parameters. The action decision module 710 may receive the premeeting information from one or more client systems. As an example and not by way of limitation, the action decision module 710 may receive premeeting information from a host of a virtual meeting. The action decision module 710 may generate one or more of an agenda, one or more premeeting tasks, meeting invitation list, and create a virtual meeting environment for the virtual meeting. The action decision module 710 may identify one or more participants of the virtual meeting and send links and premeeting materials (e.g., agenda and premeeting tasks) to participants of the virtual meeting. In particular embodiments, the action decision module 710 may send reminders to the participants of the virtual meeting corresponding to the virtual meeting and/or one or more premeeting tasks.

In particular embodiments, the real-time decision module 712 may determine one or more actions to perform during a virtual meeting. The real-time decision module 712 may receive determined individual behavioral characteristics and determined communal characteristics to make a determination of whether to perform an action to improve a meeting characteristic. The real-time decision module 712 may have predetermined criteria stored to evaluate whether an action may be performed to improve a meeting characteristic. As an example and not by way of limitation, the real-time decision module 712 may have a predetermined criteria stored where if a rate of interruptions exceeds a number of interruptions, the real-time decision module 712 generates instructions to send to client systems to perform an action. The real-time decision module 712 may have additional predetermined criteria stored to improve one or more meeting characteristics if the criteria is met. The real-time decision module 712 continually evaluates the communal characteristics that is received from the communal data module 708. In particular embodiments, in response to determining an action may be performed to improve one or more meeting characteristics, the real-time decision module 712 may send an instruction to one or more client systems associated with a virtual meeting to perform an action as described herein. The real-time decision module 712 may determine whether or which client system needs to be sent an instruction to perform an action. As an example and not by way of limitation, the real-time decision module 712 may determine that only one client system needs to be sent an instruction to perform an action. For example, a client system associated with a meeting leader may be sent instructions to display a text notification requesting the meeting leader to call on another participant to contribute to the discussion to facilitate engagement with all participants. In particular embodiments, the real-time decision module 712 may perform other virtual meeting functions as described herein. As an example and not by way of limitation, the real-time decision module 712 may record information during the virtual meeting, such as when a meeting participant is writing on a virtual screen. In particular embodiments, the real-time decision module 712 may record actions (that were recommended) taken during the virtual meeting. In particular embodiments, the real-time decision module 712 may send the records of action performed during the virtual meeting to other modules of the assistant system 702. As an example and not by way of limitation, the real-time decision module 712 may send the records to the post-meeting decision module 714. In particular embodiments, the real-time decision module 712 may communicate with artificial reality module 716 to determine one or more artificial reality alterations that may improve a meeting characteristic. As an example and not by way of limitation, altering the environment of a virtual meeting to include relaxing elements if a communal sentimental state has been determined to be low (e.g., participants are frustrated).

In particular embodiments, the post-meeting decision module 714 may determine one or more post-meeting action items to complete. In particular embodiments, the post-meeting decision module 714 may receive information from the real-time decision module 712 and user input data from the sensor module 704. As an example and not by way of limitation, the post-meeting decision module 714 may receive records of actions performed during the virtual meeting from the real-time decision module 712. The post-meeting decision module 714 may generate a meeting scorecard based on the records of actions. The post-meeting decision module 714 may generate meeting notes and a summary based on information received from the real-time decision module 712. The post-meeting decision module 714 may receive user input data from the sensor module 704 to determine whether there are additional action items to be completed and whether another virtual meeting needs to be scheduled. As an example and not by way of limitation, the post-meeting decision module 714 may determine based on a user input from one participant that another virtual meeting needs to be scheduled. The post-meeting decision module 714 may generate post meeting action items for meeting participants to complete. The post-meeting decision module 714 may set up another virtual meeting for a future date based on schedules of the participants. The post-meeting decision module 714 may generate links and send the links to the corresponding client systems associated with the participants of the virtual meeting as described herein. In particular embodiments, the post-meeting decision module 714 may send information to one or more modules of the assistant system 702.

In particular embodiments, the artificial reality module 716 may communicate with real-time decision module 712 to determine whether a change in the artificial reality environment may improve one or more meeting characteristics. The artificial reality module 716 may generate instructions to present a virtual meeting environment to the participants of the virtual meeting. The artificial reality module 716 may generate instructions to modify the virtual meeting environment and elements within the virtual meeting environment. The artificial reality module 716 may send the instructions to one or more client systems associated with the virtual meeting. In particular embodiments, the artificial reality module 716 may send the instructions to other modules to communicate with client systems of participants of the virtual meeting. As an example and not by way of limitation, the artificial reality module 716 may generate instructions to add an avatar in the virtual meeting environment and send the instructions to the real-time decision module 712. The artificial reality module 716 may communicate with one or more other modules of the assistant system 702.

Figure 8:
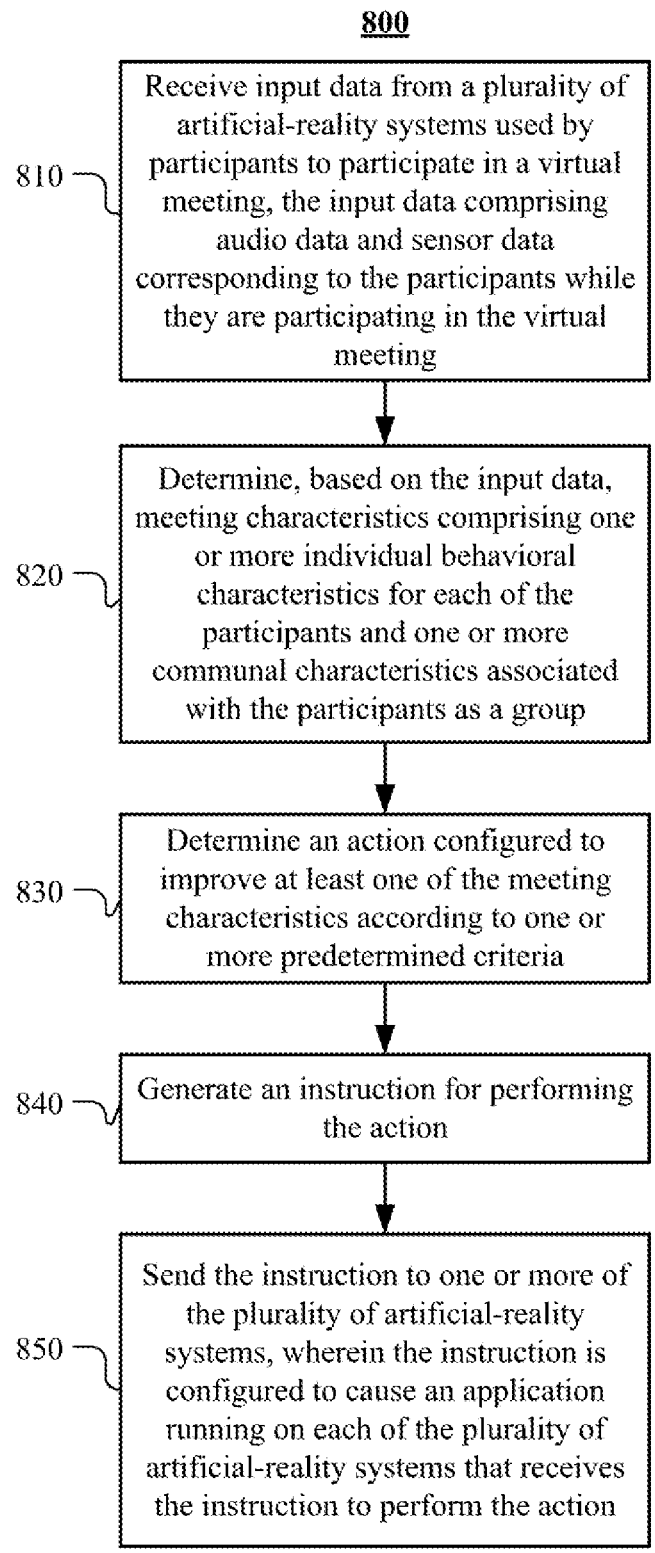
FIG. 8 illustrates an example method for determining an action configured to improve a meeting characteristic of a virtual meeting.

FIG. 8 illustrates an example method 800 for determining an action configured to improve a meeting characteristic of a virtual meeting. The method 800 may begin at step 810, where a computing system (e.g., virtual reality system) may receive input data from a plurality of artificial-reality systems used by participants to participate in a virtual meeting. In particular embodiments, the input data may comprise audio data and sensor data corresponding to the participants while they are participating in the virtual meeting. At step 820, the computing system may determine, based on the input data, meeting characteristics comprising one or more individual behavioral characteristics for each of the participants and one or more communal characteristics associated with the participants as a group. At step 830, the computing system may determine an action configured to improve at least one of the meeting characteristics according to one or more predetermined criteria. At step 840, the computing system may generate an instruction for performing the action. At step 850, the computing system may send the instruction to one or more of the plurality of artificial-reality systems. In particular embodiments, the instruction may be configured to cause an application running on each of the plurality of artificial-reality systems that receives the instruction to perform the action. Particular embodiments may repeat one or more steps of the method of FIG. 8, where appropriate. Although this disclosure describes and illustrates particular steps of the method of FIG. 8 as occurring in a particular order, this disclosure contemplates any suitable steps of the method of FIG. 8 occurring in any suitable order. Moreover, although this disclosure describes and illustrates an example method for determining an action configured to improve a meeting characteristic of a virtual meeting, including the particular steps of the method of FIG. 8, this disclosure contemplates any suitable method of determining an action configured to improve a meeting characteristic of a virtual meeting, including any suitable steps, which may include all, some, or none of the steps of the method of FIG. 8, where appropriate. Furthermore, although this disclosure describes and illustrates particular components, devices, or systems carrying out particular steps of the method of FIG. 8, this disclosure contemplates any suitable combination of any suitable components, devices, or systems carrying out any suitable steps of the method of FIG. 8.

Although this disclosure describes and illustrates processes in context of a computing system performing various functions, another computing system (e.g., a server embodied as social-networking system 960, third-party system 970, or assistant system 980) may handle the processing and send the results to the computing system.

Figure 9:
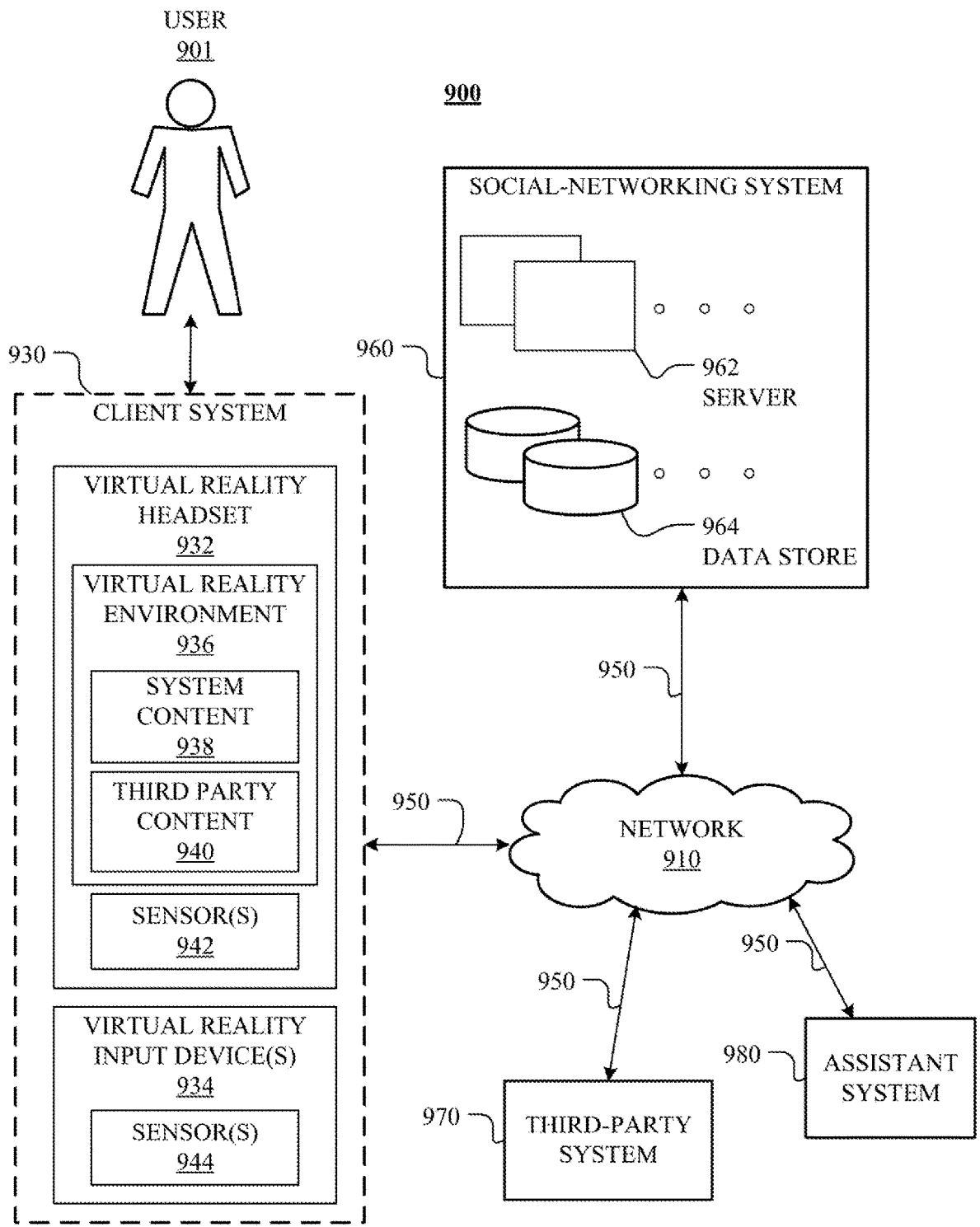
FIG. 9 illustrates an example network environment associated with a virtual reality system.

FIG. 9 illustrates an example network environment 900 associated with a virtual reality system. Network environment 900 includes a user 901 interacting with a client system 930, a social-networking system 960, a third-party system 970, and an assistant system 980 connected to each other by a network 910. Although FIG. 9 illustrates a particular arrangement of a user 901, a client system 930, a social-networking system 960, a third-party system 970, an assistant system 980, and a network 910, this disclosure contemplates any suitable arrangement of a user 901, a client system 930, a social-networking system 960, a third-party system 970, an assistant system 980, and a network 910. As an example and not by way of limitation, two or more of a user 901, a client system 930, a social-networking system 960, a third-party system 970, and an assistant system 980 may be connected to each other directly, bypassing a network 910. As another example, two or more of a client system 930, a social-networking system 960, a third-party system 970, and an assistant system 980 may be physically or logically co-located with each other in whole or in part. Moreover, although FIG. 9 illustrates a particular number of users 901, client systems 930, social-networking systems 960, third-party systems 970, assistant systems 980, and networks 910, this disclosure contemplates any suitable number of client systems 930, social-networking systems 960, third-party systems 970, assistant systems 980, and networks 910. As an example and not by way of limitation, network environment 900 may include multiple users 901, client systems 930, social-networking systems 960, third-party systems 970, assistant systems 980, and networks 910.

This disclosure contemplates any suitable network 910. As an example and not by way of limitation, one or more portions of a network 910 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. A network 910 may include one or more networks 910.

Links 950 may connect a client system 930, a social-networking system 960, and a third-party system 970 to a communication network 910 or to each other. This disclosure contemplates any suitable links 950. In particular embodiments, one or more links 950 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 950 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 950, or a combination of two or more such links 950. Links 950 need not necessarily be the same throughout a network environment 900. One or more first links 950 may differ in one or more respects from one or more second links 950.

In particular embodiments, a client system 930 may be an electronic device including hardware, software, or embedded logic components or a combination of two or more such components and capable of carrying out the appropriate functionalities implemented or supported by a client system 930. As an example and not by way of limitation, a client system 930 may include a computer system such as a desktop computer, notebook or laptop computer, netbook, a tablet computer, e-book reader, GPS device, camera, personal digital assistant (PDA), handheld electronic device, cellular telephone, smartphone, virtual reality headset and controllers, other suitable electronic device, or any suitable combination thereof. This disclosure contemplates any suitable client systems 930. A client system 930 may enable a network user at a client system 930 to access a network 910. A client system 930 may enable its user to communicate with other users at other client systems 930. A client system 930 may generate a virtual reality environment for a user to interact with content.

In particular embodiments, a client system 930 may include a virtual reality (or augmented reality) headset 932 and virtual reality input device(s) 934, such as a virtual reality controller. A user at a client system 930 may wear the virtual reality headset 932 and use the virtual reality input device(s) to interact with a virtual reality environment 936 generated by the virtual reality headset 932. Although not shown, a client system 930 may also include a separate processing computer and/or any other component of a virtual reality system. A virtual reality headset 932 may generate a virtual reality environment 936, which may include system content 938 (including but not limited to the operating system), such as software or firmware updates and also include third-party content 940, such as content from applications or dynamically downloaded from the Internet (e.g., web page content). A virtual reality headset 932 may include sensor(s) 942, such as accelerometers, gyroscopes, magnetometers to generate sensor data that tracks the location of the headset device 932. The headset 932 may also include eye trackers for tracking the position of the user's eyes or their viewing directions. The client system may use data from the sensor(s) 942 to determine velocity, orientation, and gravitation forces with respect to the headset. Virtual reality input device(s) 934 may include sensor(s) 944, such as accelerometers, gyroscopes, magnetometers, and touch sensors to generate sensor data that tracks the location of the input device 934 and the positions of the user's fingers. The client system 930 may make use of outside-in tracking, in which a tracking camera (not shown) is placed external to the virtual reality headset 932 and within the line of sight of the virtual reality headset 932. In outside-in tracking, the tracking camera may track the location of the virtual reality headset 932 (e.g., by tracking one or more infrared LED markers on the virtual reality headset 932). Alternatively or additionally, the client system 930 may make use of inside-out tracking, in which a tracking camera (not shown) may be placed on or within the virtual reality headset 932 itself. In inside-out tracking, the tracking camera may capture images around it in the real world and may use the changing perspectives of the real world to determine its own position in space.

Third-party content 940 may include a web browser and may have one or more add-ons, plug-ins, or other extensions. A user at a client system 930 may enter a Uniform Resource Locator (URL) or other address directing a web browser to a particular server (such as server 962, or a server associated with a third-party system 970), and the web browser may generate a Hyper Text Transfer Protocol (HTTP) request and communicate the HTTP request to server. The server may accept the HTTP request and communicate to a client system 930 one or more Hyper Text Markup Language (HTML) files responsive to the HTTP request. The client system 930 may render a web interface (e.g. a webpage) based on the HTML files from the server for presentation to the user. This disclosure contemplates any suitable source files. As an example and not by way of limitation, a web interface may be rendered from HTML files, Extensible Hyper Text Markup Language (XHTML) files, or Extensible Markup Language (XML) files, according to particular needs. Such interfaces may also execute scripts, combinations of markup language and scripts, and the like. Herein, reference to a web interface encompasses one or more corresponding source files (which a browser may use to render the web interface) and vice versa, where appropriate.

In particular embodiments, the social-networking system 960 may be a network-addressable computing system that can host an online social network. The social-networking system 960 may generate, store, receive, and send social-networking data, such as, for example, user-profile data, concept-profile data, social-graph information, or other suitable data related to the online social network. The social-networking system 960 may be accessed by the other components of network environment 900 either directly or via a network 910. As an example and not by way of limitation, a client system 930 may access the social-networking system 960 using a web browser of a third-party content 940, or a native application associated with the social-networking system 960 (e.g., a mobile social-networking application, a messaging application, another suitable application, or any combination thereof) either directly or via a network 910. In particular embodiments, the social-networking system 960 may include one or more servers 962. Each server 962 may be a unitary server or a distributed server spanning multiple computers or multiple datacenters. Servers 962 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 962 may include hardware, software, or embedded logic components or a combination of two or more such components for carrying out the appropriate functionalities implemented or supported by server 962. In particular embodiments, the social-networking system 960 may include one or more data stores 964. Data stores 964 may be used to store various types of information. In particular embodiments, the information stored in data stores 964 may be organized according to specific data structures. In particular embodiments, each data store 964 may be a relational, columnar, correlation, or other suitable database. Although this disclosure describes or illustrates particular types of databases, this disclosure contemplates any suitable types of databases. Particular embodiments may provide interfaces that enable a client system 930, a social-networking system 960, or a third-party system 970 to manage, retrieve, modify, add, or delete, the information stored in data store 964.

In particular embodiments, the social-networking system 960 may store one or more social graphs in one or more data stores 964. In particular embodiments, a social graph may include multiple nodes—which may include multiple user nodes (each corresponding to a particular user) or multiple concept nodes (each corresponding to a particular concept)—and multiple edges connecting the nodes. The social-networking system 960 may provide users of the online social network the ability to communicate and interact with other users. In particular embodiments, users may join the online social network via the social-networking system 960 and then add connections (e.g., relationships) to a number of other users of the social-networking system 960 whom they want to be connected to. Herein, the term "friend" may refer to any other user of the social-networking system 960 with whom a user has formed a connection, association, or relationship via the social-networking system 960.

In particular embodiments, the social-networking system 960 may provide users with the ability to take actions on various types of items or objects, supported by the social-networking system 960. As an example and not by way of limitation, the items and objects may include groups or social networks to which users of the social-networking system 960 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in the social-networking system 960 or by an external system of a third-party system 970, which is separate from the social-networking system 960 and coupled to the social-networking system 960 via a network 910.

In particular embodiments, the social-networking system 960 may be capable of linking a variety of entities. As an example and not by way of limitation, the social-networking system 960 may enable users to interact with each other as well as receive content from third-party systems 970 or other entities, or to allow users to interact with these entities through an application programming interfaces (API) or other communication channels.

In particular embodiments, a third-party system 970 may include one or more types of servers, one or more data stores, one or more interfaces, including but not limited to APIs, one or more web services, one or more content sources, one or more networks, or any other suitable components, e.g., that servers may communicate with. A third-party system 970 may be operated by a different entity from an entity operating the social-networking system 960. In particular embodiments, however, the social-networking system 960 and third-party systems 970 may operate in conjunction with each other to provide social-networking services to users of the social-networking system 960 or third-party systems 970. In this sense, the social-networking system 960 may provide a platform, or backbone, which other systems, such as third-party systems 970, may use to provide social-networking services and functionality to users across the Internet.

In particular embodiments, a third-party system 970 may include a third-party content object provider. A third-party content object provider may include one or more sources of content objects, which may be communicated to a client system 930. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, the social-networking system 960 also includes user-generated content objects, which may enhance a user's interactions with the social-networking system 960. User-generated content may include anything a user can add, upload, send, or "post" to the social-networking system 960. As an example and not by way of limitation, a user communicates posts to the social-networking system 960 from a client system 930. Posts may include data such as status updates or other textual data, location information, photos, videos, links, music or other similar data or media. Content may also be added to the social-networking system 960 by a third-party through a "communication channel," such as a newsfeed or stream.

In particular embodiments, the social-networking system 960 may include a variety of servers, sub-systems, programs, modules, logs, and data stores. In particular embodiments, the social-networking system 960 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. The social-networking system 960 may also include suitable components such as network interfaces, security mechanisms, load balancers, failover servers, management-and-network-operations consoles, other suitable components, or any suitable combination thereof. In particular embodiments, the social-networking system 960 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories.

Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking the social-networking system 960 to one or more client systems 930 or one or more third-party systems 970 via a network 910. The web server may include a mail server or other messaging functionality for receiving and routing messages between the social-networking system 960 and one or more client systems 930. An API-request server may allow a third-party system 970 to access information from the social-networking system 960 by calling one or more APIs. An action logger may be used to receive communications from a web server about a user's actions on or off the social-networking system 960. In conjunction with the action log, a third-party-content-object log may be maintained of user exposures to third-party-content objects. A notification controller may provide information regarding content objects to a client system 930. Information may be pushed to a client system 930 as notifications, or information may be pulled from a client system 930 responsive to a request received from a client system 930. Authorization servers may be used to enforce one or more privacy settings of the users of the social-networking system 960. A privacy setting of a user determines how particular information associated with a user can be shared. The authorization server may allow users to opt in to or opt out of having their actions logged by the social-networking system 960 or shared with other systems (e.g., a third-party system 970), such as, for example, by setting appropriate privacy settings. Third-party-content-object stores may be used to store content objects received from third parties, such as a third-party system 970. Location stores may be used for storing location information received from client systems 930 associated with users. Advertisement-pricing modules may combine social information, the current time, location information, or other suitable information to provide relevant advertisements, in the form of notifications, to a user.

In particular embodiments, the assistant system 980 may assist users to retrieve information from different sources. The assistant system 980 may also assist user to request services from different service providers. In particular embodiments, the assistant system 980 may receive a user request for information or services the client system 930. The assistant system 980 may use natural-language understanding to analyze the user request based on user's profile and other relevant information. The result of the analysis may comprise different entities associated with an online social network. The assistant system 980 may then retrieve information or request services associated with these entities. In particular embodiments, the assistant system 980 may interact with the social-networking system 960 and/or third-party system 970 when retrieving information or requesting services for the user. In particular embodiments, the assistant system 980 may generate a personalized communication content for the user using natural-language generating techniques. The personalized communication content may comprise, for example, the retrieved information or the status of the requested services. In particular embodiments, the assistant system 980 may enable the user to interact with it regarding the information or services in a stateful and multi-turn conversation by using dialog-management techniques. In particular embodiments, the assistant system 980 may help facilitate a virtual meeting between the client system 930 and other client systems 930. In particular embodiments, the assistant system 980 may include a variety of servers, sub-systems, programs, modules, logs, and data stores.

Figure 10:
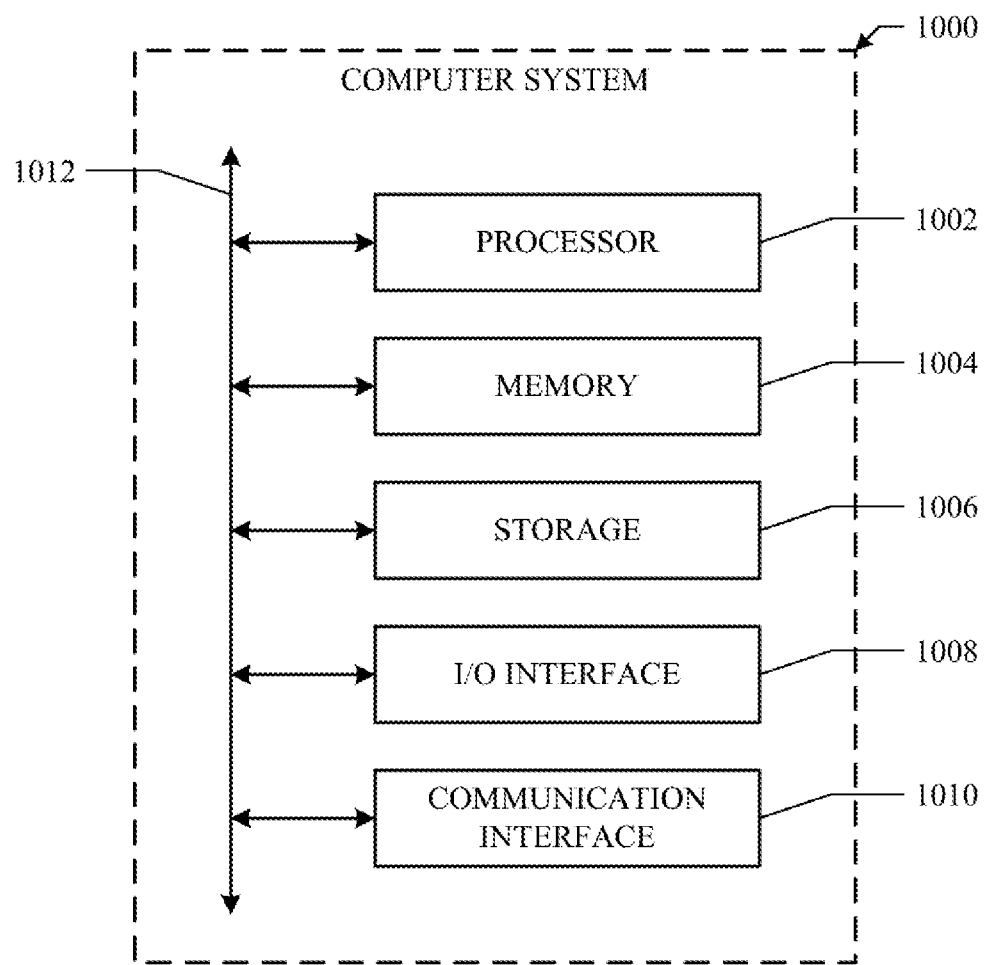
FIG. 10 illustrates an example computer system.

FIG. 10 illustrates an example computer system 1000. In particular embodiments, one or more computer systems 1000 perform one or more steps of one or more methods described or illustrated herein. In particular embodiments, one or more computer systems 1000 provide functionality described or illustrated herein. In particular embodiments, software running on one or more computer systems 1000 performs one or more steps of one or more methods described or illustrated herein or provides functionality described or illustrated herein. Particular embodiments include one or more portions of one or more computer systems 1000. Herein, reference to a computer system may encompass a computing device, and vice versa, where appropriate. Moreover, reference to a computer system may encompass one or more computer systems, where appropriate.

This disclosure contemplates any suitable number of computer systems 1000. This disclosure contemplates computer system 1000 taking any suitable physical form. As example and not by way of limitation, computer system 1000 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 1000 may include one or more computer systems 1000; be unitary or distributed; span multiple locations; span multiple machines; span multiple data centers; or reside in a cloud, which may include one or more cloud components in one or more networks. Where appropriate, one or more computer systems 1000 may perform without substantial spatial or temporal limitation one or more steps of one or more methods described or illustrated herein. As an example and not by way of limitation, one or more computer systems 1000 may perform in real time or in batch mode one or more steps of one or more methods described or illustrated herein. One or more computer systems 1000 may perform at different times or at different locations one or more steps of one or more methods described or illustrated herein, where appropriate.

In particular embodiments, computer system 1000 includes a processor 1002, memory 1004, storage 1006, an input/output (I/O) interface 1008, a communication interface 1010, and a bus 1012. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1002 includes hardware for executing instructions, such as those making up a computer program. As an example and not by way of limitation, to execute instructions, processor 1002 may retrieve (or fetch) the instructions from an internal register, an internal cache, memory 1004, or storage 1006; decode and execute them; and then write one or more results to an internal register, an internal cache, memory 1004, or storage 1006. In particular embodiments, processor 1002 may include one or more internal caches for data, instructions, or addresses. This disclosure contemplates processor 1002 including any suitable number of any suitable internal caches, where appropriate. As an example and not by way of limitation, processor 1002 may include one or more instruction caches, one or more data caches, and one or more translation lookaside buffers (TLBs). Instructions in the instruction caches may be copies of instructions in memory 1004 or storage 1006, and the instruction caches may speed up retrieval of those instructions by processor 1002. Data in the data caches may be copies of data in memory 1004 or storage 1006 for instructions executing at processor 1002 to operate on; the results of previous instructions executed at processor 1002 for access by subsequent instructions executing at processor 1002 or for writing to memory 1004 or storage 1006; or other suitable data. The data caches may speed up read or write operations by processor 1002. The TLBs may speed up virtual-address translation for processor 1002. In particular embodiments, processor 1002 may include one or more internal registers for data, instructions, or addresses. This disclosure contemplates processor 1002 including any suitable number of any suitable internal registers, where appropriate. Where appropriate, processor 1002 may include one or more arithmetic logic units (ALUs); be a multi-core processor; or include one or more processors 1002. Although this disclosure describes and illustrates a particular processor, this disclosure contemplates any suitable processor.

In particular embodiments, memory 1004 includes main memory for storing instructions for processor 1002 to execute or data for processor 1002 to operate on. As an example and not by way of limitation, computer system 1000 may load instructions from storage 1006 or another source (such as, for example, another computer system 1000) to memory 1004. Processor 1002 may then load the instructions from memory 1004 to an internal register or internal cache. To execute the instructions, processor 1002 may retrieve the instructions from the internal register or internal cache and decode them. During or after execution of the instructions, processor 1002 may write one or more results (which may be intermediate or final results) to the internal register or internal cache. Processor 1002 may then write one or more of those results to memory 1004. In particular embodiments, processor 1002 executes only instructions in one or more internal registers or internal caches or in memory 1004 (as opposed to storage 1006 or elsewhere) and operates only on data in one or more internal registers or internal caches or in memory 1004 (as opposed to storage 1006 or elsewhere). One or more memory buses (which may each include an address bus and a data bus) may couple processor 1002 to memory 1004. Bus 1012 may include one or more memory buses, as described below. In particular embodiments, one or more memory management units (MMUs) reside between processor 1002 and memory 1004 and facilitate accesses to memory 1004 requested by processor 1002. In particular embodiments, memory 1004 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1004 may include one or more memories 1004, where appropriate. Although this disclosure describes and illustrates particular memory, this disclosure contemplates any suitable memory.

In particular embodiments, storage 1006 includes mass storage for data or instructions. As an example and not by way of limitation, storage 1006 may include a hard disk drive (HDD), a floppy disk drive, flash memory, an optical disc, a magneto-optical disc, magnetic tape, or a Universal Serial Bus (USB) drive or a combination of two or more of these. Storage 1006 may include removable or non-removable (or fixed) media, where appropriate. Storage 1006 may be internal or external to computer system 1000, where appropriate. In particular embodiments, storage 1006 is non-volatile, solid-state memory. In particular embodiments, storage 1006 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1006 taking any suitable physical form. Storage 1006 may include one or more storage control units facilitating communication between processor 1002 and storage 1006, where appropriate. Where appropriate, storage 1006 may include one or more storages 1006. Although this disclosure describes and illustrates particular storage, this disclosure contemplates any suitable storage.

In particular embodiments, I/O interface 1008 includes hardware, software, or both, providing one or more interfaces for communication between computer system 1000 and one or more I/O devices. Computer system 1000 may include one or more of these I/O devices, where appropriate. One or more of these I/O devices may enable communication between a person and computer system 1000. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1008 for them. Where appropriate, I/O interface 1008 may include one or more device or software drivers enabling processor 1002 to drive one or more of these I/O devices. I/O interface 1008 may include one or more I/O interfaces 1008, where appropriate. Although this disclosure describes and illustrates a particular I/O interface, this disclosure contemplates any suitable I/O interface.

In particular embodiments, communication interface 1010 includes hardware, software, or both providing one or more interfaces for communication (such as, for example, packet-based communication) between computer system 1000 and one or more other computer systems 1000 or one or more networks. As an example and not by way of limitation, communication interface 1010 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1010 for it. As an example and not by way of limitation, computer system 1000 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1000 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1000 may include any suitable communication interface 1010 for any of these networks, where appropriate. Communication interface 1010 may include one or more communication interfaces 1010, where appropriate. Although this disclosure describes and illustrates a particular communication interface, this disclosure contemplates any suitable communication interface.

In particular embodiments, bus 1012 includes hardware, software, or both coupling components of computer system 1000 to each other. As an example and not by way of limitation, bus 1012 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1012 may include one or more buses 1012, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by a computing system:
   receiving input data from a plurality of artificial-reality systems used by participants to participate in a virtual meeting, the input data comprising audio data and sensor data corresponding to the participants while they are participating in the virtual meeting, wherein:
   the virtual meeting is represented in an artificial-reality environment comprising at least avatar representations of the participants of the virtual meeting and a virtual screen for displaying information relating to the virtual meeting; and
   a first participant of the virtual meeting sees the avatar representations of other participants of the virtual meeting and the virtual screen using a first artificial-reality system of the first participant;
   determining, based on the input data, meeting characteristics comprising both of (1) one or more individual behavioral characteristics for each of the participants and (2) one or more communal characteristics associated with the participants of the virtual meeting as a group;
   determining an action configured to improve at least one of the meeting characteristics according to one or more predetermined criteria, wherein the one or more predetermined criteria is identified based on a plurality of previous virtual meetings, and wherein the one or more predetermined criteria indicates a trigger condition to perform the action based on the at least one of the meeting characteristics;
   generating an instruction for performing the action in response to meeting the trigger condition; and
   sending the instruction to one or more of the plurality of artificial-reality systems, wherein the instruction is configured to cause an application running on each of the plurality of artificial-reality systems that receives the instruction to convey a message through the virtual screen present in the artificial-reality environment and shared between the participants of the virtual meeting, the message being targeted to one or more particular participants interrupting the other participants in the virtual meeting.

2. The method of claim 1, wherein the one or more individual behavioral characteristics comprise one or more of a content of speech, tone of voice, prosody, head pose, gaze, eye movements, body movements, and facial expression.

3. The method of claim 1, wherein the one or more communal characteristics comprise one or more of a rate of conversational turns, speaker dominance, rate of interruptions, and a communal sentimental state.

4. The method of claim 3, wherein the one or more predetermined criteria comprises the rate of conversational turns is below a threshold rate within a predetermined time period, and wherein the action configured to improve the at least one of the meeting characteristics comprises displaying an indication requesting participation from one or more participants that have not talked for a threshold time period within the predetermined time period.

5. The method of claim 3, wherein the one or more predetermined criteria comprises one of the participants talking for a time that is greater than a predetermined time period, and wherein the action configured to improve the at least one of the meeting characteristics comprises displaying an indication requesting the participant to call on another participant.

6. The method of claim 3, wherein the one or more predetermined criteria comprises the rate of interruptions exceeds a threshold number of interruptions, and wherein the action configured to improve the at least one of the meeting characteristics comprises displaying an indication notifying participants that another participant is in the middle of a sentence.

7. The method of claim 3, wherein the one or more predetermined criteria comprises the communal sentimental state is a predetermined communal sentiment state, and wherein the action configured to improve the at least one of the meeting characteristics comprises displaying an indication to improve the communal sentimental state.

8. The method of claim 1, wherein the action configured to improve at least one of the meeting characteristics comprises altering the artificial-reality environment associated with the virtual meeting.

9. The method of claim 8, wherein altering the artificial-reality environment associated with the virtual meeting comprises one or more of changing a virtual reality environment associated with the virtual meeting, displaying one or more augmented reality elements to an augmented reality environment associated with the virtual meeting, and displaying an avatar associated with the virtual meeting.

10. The method of claim 1, wherein one of the participants is identified as a meeting leader, and wherein sending the instruction to the one or more of the plurality of artificial-reality systems comprises sending the instruction to the artificial-reality system associated with the meeting leader.

11. The method of claim 1, further comprising:
receiving, prior to the virtual meeting, information corresponding to the virtual meeting comprising one or more meeting parameters;
generating one or more premeeting items comprising a virtual meeting agenda, a virtual meeting task list, or a virtual meeting invitation based on the information corresponding to the virtual meeting; and
sending the one or more premeeting items to the one or more of the plurality of artificial-reality systems.

12. The method of claim 11, further comprising:
identifying one or more action items for the virtual meeting based on the one or more premeeting items;
tracking the one or more action items for the virtual meeting based on the one or more meeting parameters;
generating an instruction for presenting an indication of one of the one or more action items based on the tracking of the one or more action items for the virtual meeting; and
sending the instruction for presenting the indication to the one or more of the plurality of artificial-reality systems.

13. The method of claim 1, further comprising:
identifying one or more post meeting action items for the virtual meeting based on the input data received form the plurality of artificial-reality systems, wherein the one or more post meeting action items comprise one or more of meeting notes and summary, scheduling another virtual meeting, and a meeting scorecard comprising an evaluation of the virtual meeting.

14. One or more computer-readable non-transitory storage media embodying software that is operable when executed to:
receive input data from a plurality of artificial-reality systems used by participants to participate in a virtual meeting, the input data comprising audio data and sensor data corresponding to the participants while they are participating in the virtual meeting, wherein:
the virtual meeting is represented in an artificial-reality environment comprising at least avatar representations of the participants of the virtual meeting and a virtual screen for displaying information relating to the virtual meeting; and
a first participant of the virtual meeting sees the avatar representations of other participants of the virtual meeting and the virtual screen using a first artificial-reality system of the first participant;
determine, based on the input data, meeting characteristics comprising both of (1) one or more individual behavioral characteristics for each of the participants and (2) one or more communal characteristics associated with the participants of the virtual meeting as a group;
determine an action configured to improve at least one of the meeting characteristics according to one or more predetermined criteria, wherein the one or more predetermined criteria is identified based on a plurality of previous virtual meetings, and wherein the one or more predetermined criteria indicates a trigger condition to perform the action based on the at least one of the meeting characteristics;
generate an instruction for performing the action in response to meeting the trigger condition; and
send the instruction to one or more of the plurality of artificial-reality systems, wherein the instruction is configured to cause an application running on each of the plurality of artificial-reality systems that receives the instruction to convey a message through the virtual screen present in the artificial-reality environment and shared between the participants of the virtual meeting, the message being targeted to one or more particular participants interrupting the other participants in the virtual meeting.

15. A system comprising: one or more processors; and a non-transitory memory coupled to the processors comprising instructions executable by the processors, the processors operable when executing the instructions to:
receive input data from a plurality of artificial-reality systems used by participants to participate in a virtual meeting, the input data comprising audio data and sensor data corresponding to the participants while they are participating in the virtual meeting, wherein:
the virtual meeting is represented in an artificial-reality environment comprising at least avatar representations of the participants of the virtual meeting and a virtual screen for displaying information relating to the virtual meeting; and
a first participant of the virtual meeting sees the avatar representations of other participants of the virtual meeting and the virtual screen using a first artificial-reality system of the first participant;
determine, based on the input data, meeting characteristics comprising both of (1) one or more individual behavioral characteristics for each of the participants and (2) one or more communal characteristics associated with the participants of the virtual meeting as a group;

determine an action configured to improve at least one of the meeting characteristics according to one or more predetermined criteria, wherein the one or more predetermined criteria is identified based on a plurality of previous virtual meetings, and wherein the one or more predetermined criteria indicates a trigger condition to perform the action based on the at least one of the meeting characteristics;

generate an instruction for performing the action in response to meeting the trigger condition; and send the instruction to one or more of the plurality of artificial-reality systems, wherein the instruction is configured to cause an application running on each of the plurality of artificial-reality systems that receives the instruction to convey a message through the virtual screen present in the artificial-reality environment and shared between the participants of the virtual meeting, the message being targeted to one or more particular participants interrupting the other participants in the virtual meeting.

\* \* \* \* \*